United States Patent [19]

Miwa

[11] Patent Number: 5,076,098

[45] Date of Patent: Dec. 31, 1991

[54] SYSTEM FOR DETECTING COMBUSTION STATE IN INTERNAL COMBUSTION ENGINE

[75] Inventor: Hiromichi Miwa, Kanagawa, Japan

[73] Assignee: Nissan Motor Company, Limited, Japan

[21] Appl. No.: 656,729

[22] Filed: Feb. 19, 1991

[30] Foreign Application Priority Data

Feb. 21, 1990 [JP] Japan .................................. 2-40796
Feb. 23, 1990 [JP] Japan .................................. 2-43714
Feb. 23, 1990 [JP] Japan .................................. 2-43716

[51] Int. Cl.⁵ .................................... G01M 15/00
[52] U.S. Cl. .................................... 73/115
[58] Field of Search .................. 73/117.3, 116, 115

[56] References Cited

FOREIGN PATENT DOCUMENTS 54138 3/1987 Japan .................................. 73/116
172729 7/1989 Japan .................................. 73/116

Primary Examiner—Jerry W. Myracle
Attorney, Agent, or Firm—Lowe, Price, LeBlanc & Becker

[57] ABSTRACT

A system for detecting combustion state in an internal combustion engine, detects cylinder pressures in a detecting range from 120° to 240° of crank angle, i.e. from 60° BTDC and 60° ATDC positions, for respective cylinders by means of cylinder pressure sensors, to predict cylinder pressures in a range other than the detecting range in compression and expansion strokes. On the basis of these cylinder pressures, the system derives an indicated mean effective pressure $P_i+i$. This indicated mean effective pressure $P_i+i$ is used for determining occurence of misfire in the engine.

14 Claims, 31 Drawing Sheets

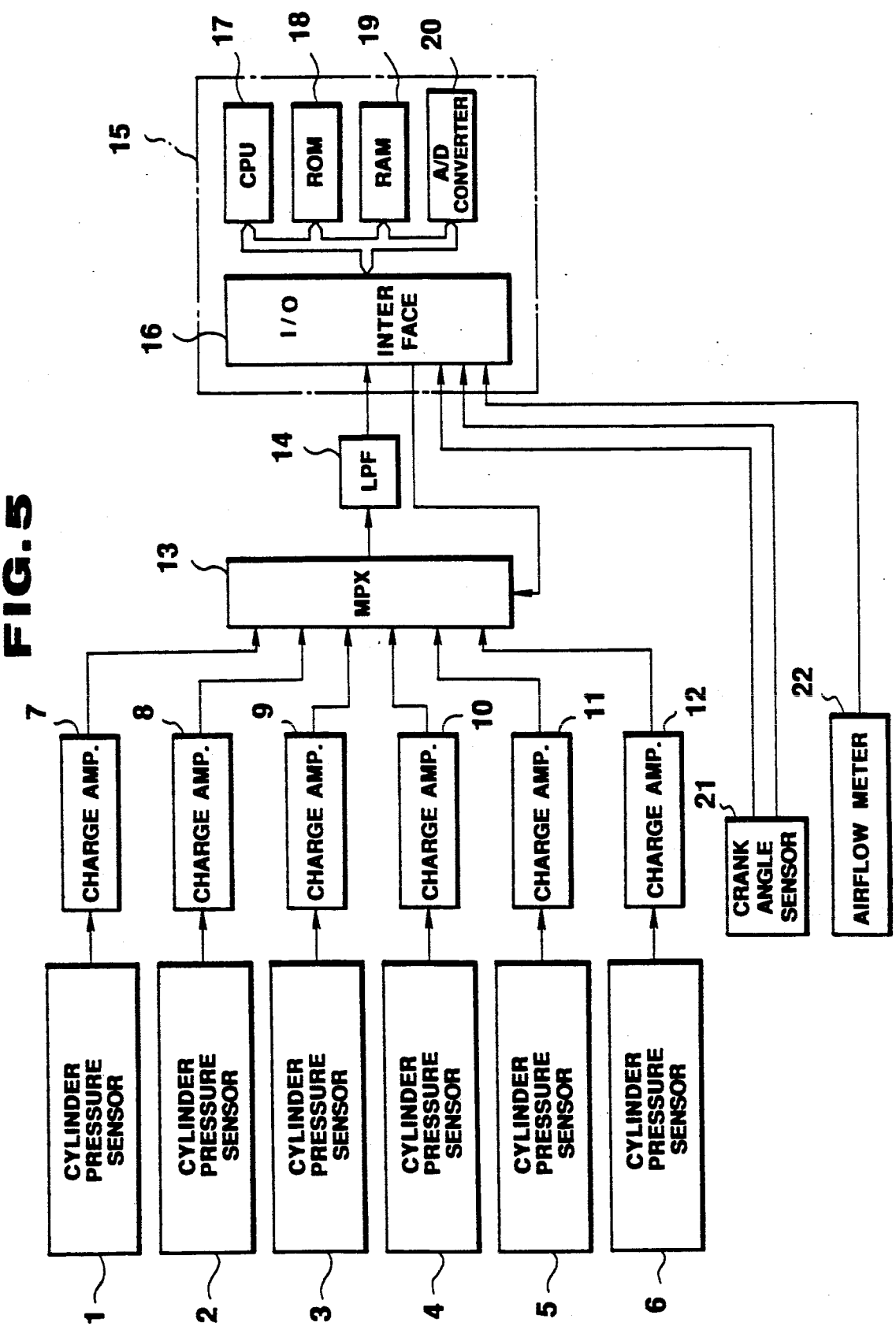

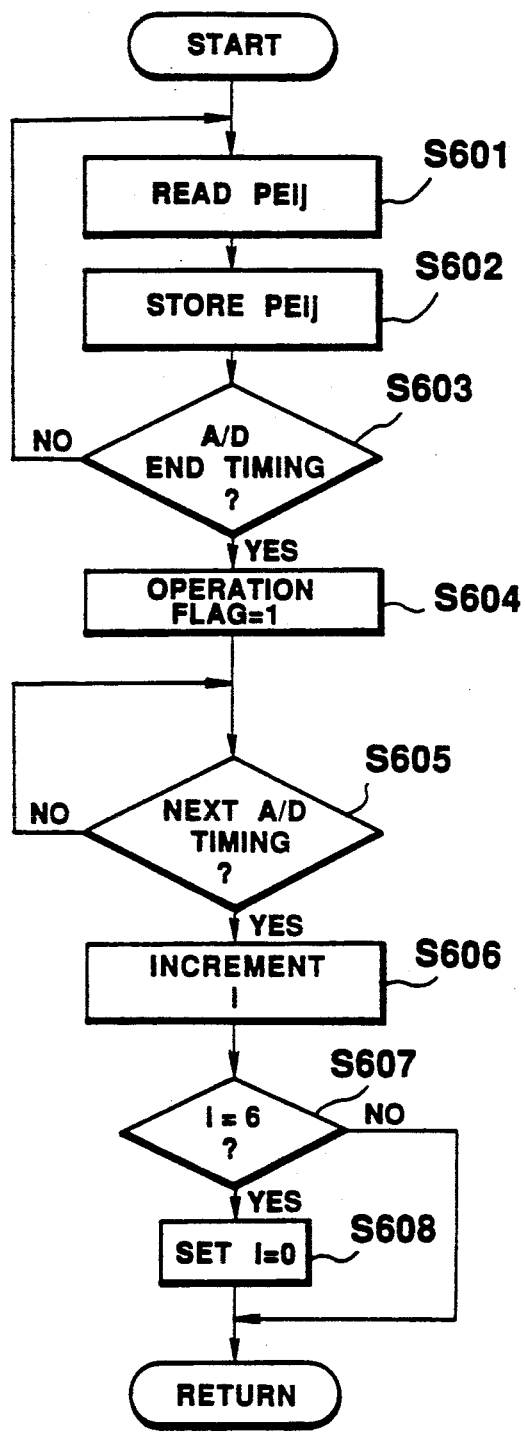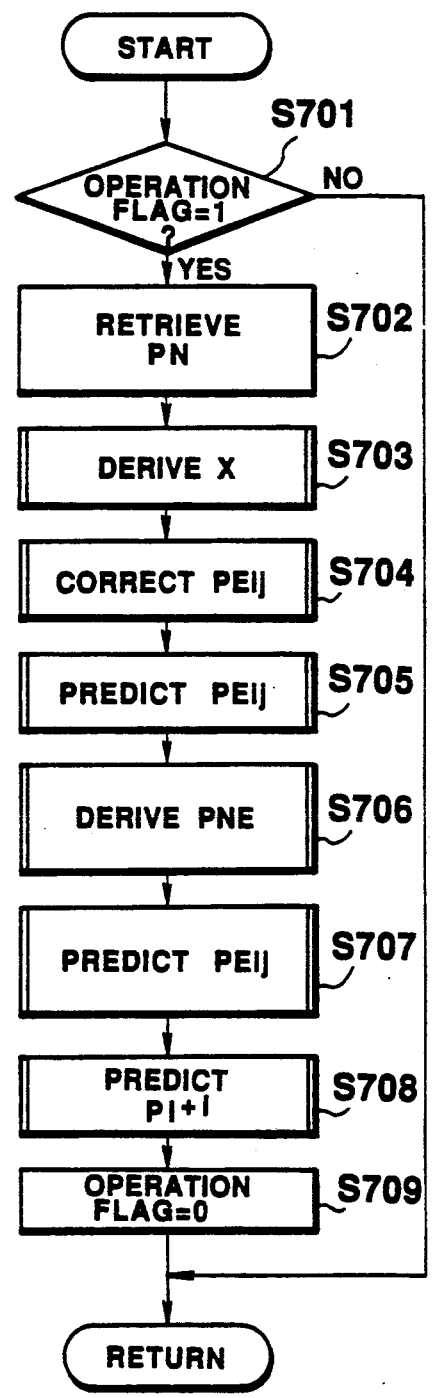

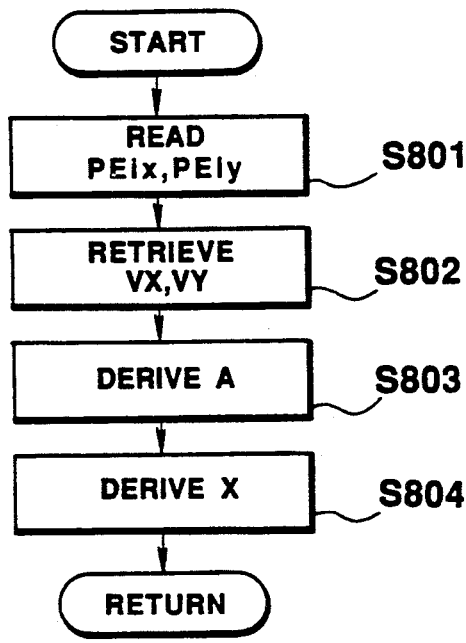
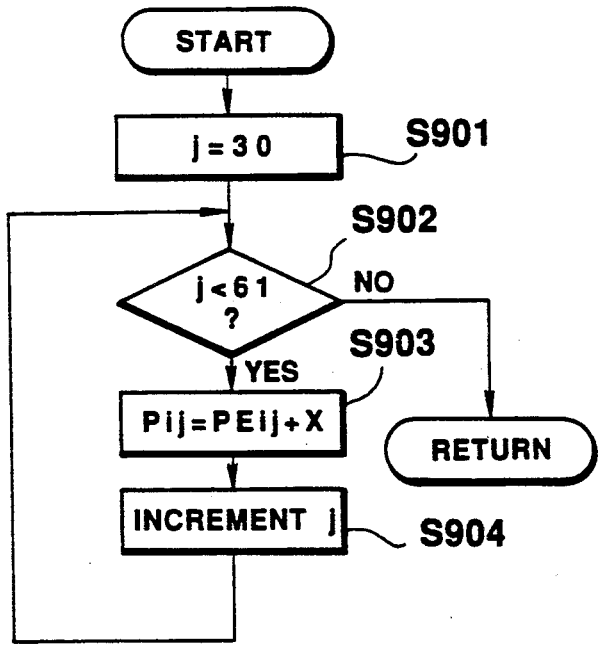

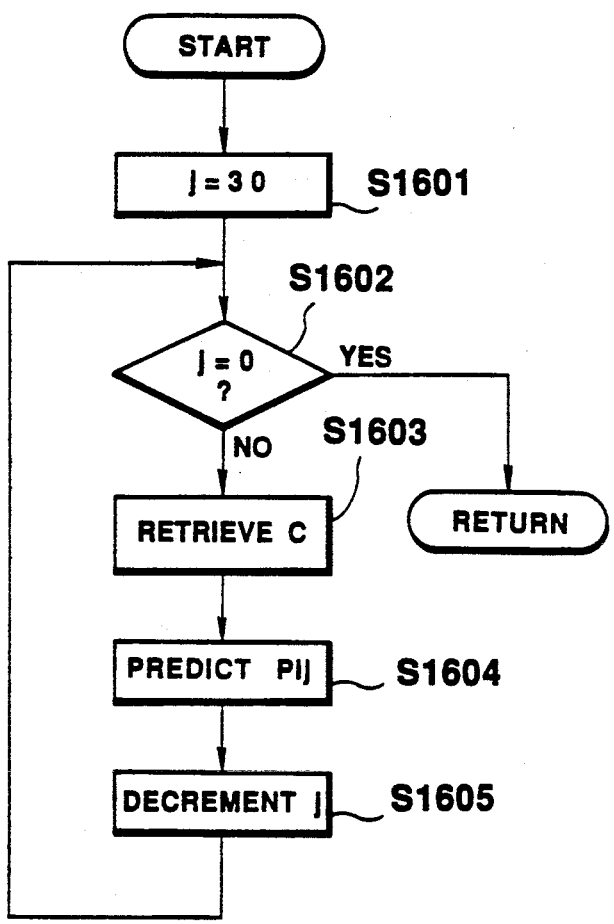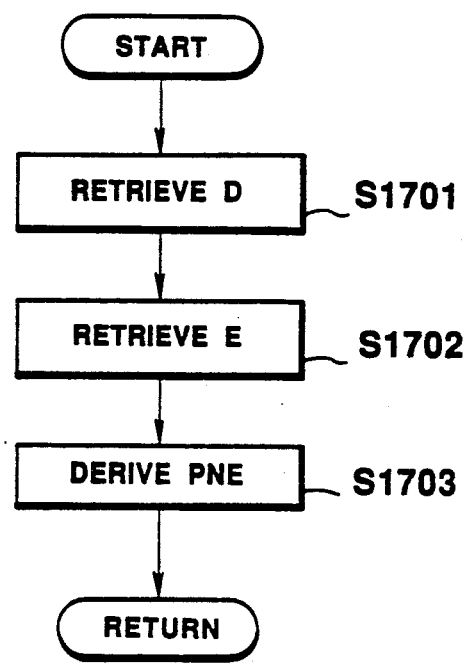

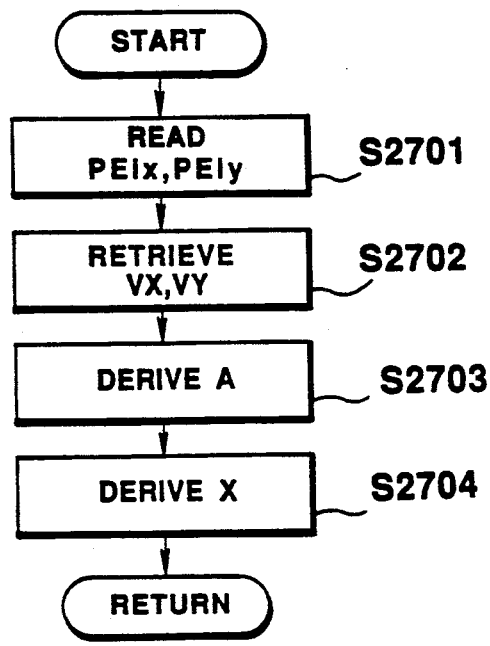
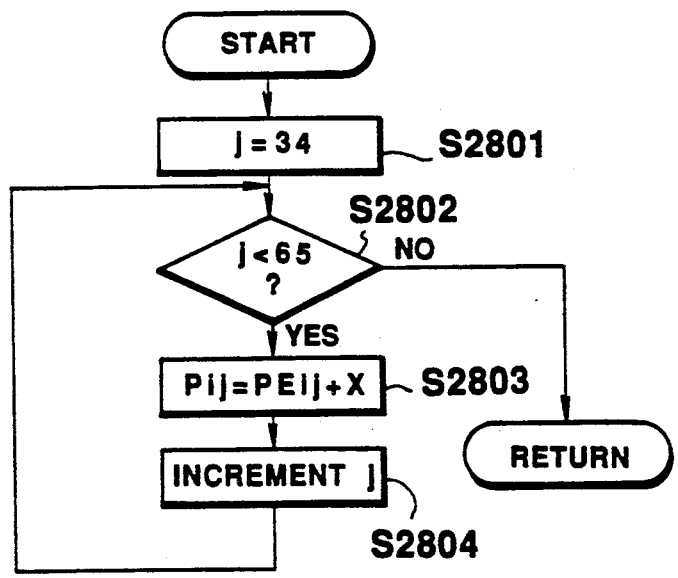

SYSTEM FOR DETECTING COMBUSTION STATE IN INTERNAL COMBUSTION ENGINE

BACKGROUND OF THE INVENTION

1. Field of the Invention

The present invention relates generally to a system for detecting combustion state in automotive internal combustion engines. More specifically, the invention relates to a combustion state detecting system which monitors cylinder pressures to diagnose or detect combustion state, such as misfiring, in internal combustion engines.

2. Description of the Background Art

Various systems for detecting cylinder pressure (pressure in a combustion chamber) to diagnose or detect a combustion state, such as occurrence of misfire, in an internal combustion engine have been proposed. Generally, the proposed systems can determine an actual combustion state by deriving a maximum cylinder pressure or a mean effective pressure Pi in a particular engine running condition. One such combustion state detecting systems is described in "Internal Combustion Engine" (published on September 1962 by Sankaido Co., Ltd.; VOL. 1, page 19).

In this system, cylinder pressures for the respective cylinders are detected for intervals of two engine revolutions, e.g. 720° of a crankshaft in the case of a four-cycle engine, by means of cylinder pressure sensors installed in respective engine cylinders, to derive the mean effective pressure Pi on the basis of the detected cylinder pressures.

Many engines installed on vehicles are multiple cylinder type engines which have four or more cylinders. If the aforementioned combustion state detecting system is applied to such a multiple cylinder type engine, there are disadvantages. That is, when cylinder pressures for the respective cylinders are detected at intervals of two engine revolutions to derive a mean effective pressure Pi for the respective cylinders, if a microcomputer is used, a high-speed A/D converter for converting the detected cylinder pressures from analog to digital and a high-speed CPU for deriving the mean effective pressures Pi must be used for the system. This causes the system to become expensive.

In order to eliminate the aforementioned disadvantage, Japanese Patent First (unexamined) Publication (Tokkai Sho.) No. 62-265548 discloses an improved combustion state detecting system. This system is basically designed to derive a pseudo-Pi (mean effective pressure) from cylinder pressures P which are detected at the interval of a predetermined crank angle, e.g. 180°, and fine variations $\Delta V$ of cylinder volume at every cycle of the predetermined crank angle, in accordance with the following equation.

$$Pi = (1/V_s) \times \left\{ \sum_{\theta=x}^{y} \Delta(\theta) \times P(\theta) \right\}$$

Japanese Patent First (unexamined) Publication (Tokkai Sho.) No. 62-238433 discloses another combustion state detecting system, which is designed to derive a pseudo-Pi for an interval in which cylinder pressure is greater than a predetermined value, in accordance with the aforementioned equation. In addition, Japanese Patent First (unexamined) Publication (Tokkai Sho.) No. 62-238434 discloses another combustion state detecting system, which is designed to derive a pseudo-Pi for an interval in which cylinder pressure is greater than a predetermined value after a spark ignition timing, in accordance with the aforementioned equation.

However, since these systems derive a pseudo-Pi according to an interval of a predetermined crank angle, there is a disadvantage as follows.

That is, when a combustion state becomes worse so that the combustion time becomes longer as shown by a chain line of FIG. 1, a relationship between the pseudo-Pi and the mean effective pressure Pi for the interval of 720° of crank angle greatly deviates from the original relationship therebetween as shown in FIG. 2. This causes the detection accuracy of combustion state to become worse. As a result, there is a disadvantage in that the control accuracy for spark ignition timing, an air/fuel ratio, an exhaust gas circulating amount and so forth also becomes worse.

Furthermore, Japanese Patent First (unexamined) Publication (Tokkai Sho.) No. 62-203036 discloses another combustion state detecting system, which is designed to detect actual cylinder pressures in a predetermined region near a compression stroke top-dead-center (TDC) position of the crankshaft, and to retrieve cylinder pressures in the other regions from a map in accordance with engine running conditions, such as the intake air flow rate, the opening angle of a throttle valve, the engine revolution speed. On the basis of these cylinder pressures, the mean effective pressure is derived for an interval of 720° of the crank angle.

However, since the combustion state always varies, it is difficult for the aforementioned system which retrieves cylinder pressure from a preset map, to predict or forecast actual cylinder pressures. Therefore, in the aforementioned system, there is a disadvantage in that the detection accuracy of Pi or combustion state may become worsened.

In addition, Japanese Patent First (unexamined) Publication (Tokkai Sho.) No. 53-129717 discloses a misfire detecting system which integrates a cylinder pressure detected by a cylinder pressure sensor over two predetermined intervals before and after a compression stroke top-dead-center (TDC) position of the crankshaft, to determine an occurrence of misfire when a difference between these integrated values becomes less than a predetermined value.

Japanese Patent First (unexamined) Publication (Tokkai Sho.) No. 57-113344 discloses another misfire detecting system which integrates the detected cylinder pressure over two predetermined intervals before and after a compression stroke top-dead-center position, to determine an occurrence of misfire when a ratio of one integrated value to the other integrated value becomes less than a predetermined value.

As mentioned above, such conventional misfire detecting systems determine an occurrence of misfire by comparing the integrated values of the cylinder pressure over predetermined intervals before and after compression top-dead-center. Therefore, there is a disadvantage in that the systems may mistakenly an occurrence of misfire in the case of an abnormal combustion in which the peak of cylinder pressure is positioned at the compression stroke top-dead-center position as shown by a chain line of FIG. 3 due to over-advancing of the spark ignition timing.

In addition, in a case where these systems determine an occurrence of misfire by means of a microcomputer, there is a disadvantage in that, when delay of combustion becomes great due to delay of spark ignition timing and so forth, it is difficult to discriminate the delay of combustion from an occurrence of misfire, which causes misfire detection accuracy to become worse, since the sampling period of time is limited to 720° divided by the number of cylinders. In the case of a four-cycle engine the sampling time becomes insufficient. That is, in such a limited sampling period, the difference between variations of cylinder pressure when misfire occurs and when combustion greatly delayed, is small as shown in FIG. 4. Therefore, the difference between the integrated values of these cylinder pressures is small (see a portion shown by slash marks in FIG. 4), so that it is difficult to discriminate an occurrence of misfire from delay of combustion.

Furthermore, Japanese Patent First (unexamined) Publication (Tokkai Sho.) No. 57-114837 discloses another misfire detecting system which predicts an integrated value of cylinder pressure when misfire occurs, by multiplying cylinder pressure before ignition or its integrated value by a predetermined coefficient.

However, in this system, there is disadvantages in that it is difficult to set the coefficient to the optimum, and that the sampling period of time is limited, which causes degradation of misfire detection accuracy.

SUMMARY OF THE INVENTION

It is therefore a principal object of the present invention to provide an improved system which can accurately detect combustion state in an internal combustion engine.

It is another object of the present invention to provide an improved system which can discriminate an occurrence of misfire from delay of combustion to accurately detect the occurrence of misfire.

In order to accomplish the aforementioned and other objects, a system for detecting combustion state in an internal combustion engine, detects cylinder pressures in a predetermined detecting range for respective cylinders by means of cylinder pressure sensors, to predict cylinder pressures in a range other than the predetermined detecting range in compression and expansion strokes. On the basis of these cylinder pressures, the system derives an indicated means effective pressure $P_i+i$. This indicated mean effective pressure $P_i+i$ is used for determining occurrence of misfire in the engine.

According to another aspect of the present invention, a system for detecting combustion state in an internal combustion engine, comprises: cylinder pressure detecting means for monitoring cylinder pressure in a combustion chamber to produce a cylinder pressure indicative signal; crank angle detecting means for monitoring an angular position of a crankshaft to produce a crank angle indicative signal; sampling means for sampling the cylinder pressure indicative signal at every predetermined crank angle for a predetermined sampling period which corresponds to a predetermined range of crank angle determined on the basis of the crank angle indicative signal; volume deriving means for deriving a volume of the combustion chamber for every predetermined crank angle; bias quantity deriving means for deriving a bias quantity used for biasing the cylinder pressure indicative signal, on the basis of the derived volume of the combustion chamber for the sampling period, and on the basis of the sampled cylinder pressure indicative signals; cylinder pressure correcting means for correcting the sampled cylinder pressure indicative signals on the basis of the derived bias quantity; cylinder pressure predicting means for predicting cylinder pressures for an non-sampling period in which the crankshaft is positioned out of the predetermined range of crank angle; and mean effective pressure deriving means for deriving an indicated mean effective pressure on the basis of the corrected cylinder pressure and the predicted cylinder pressure.

The system may further comprises: motoring pressure predicting means for predicting a motoring pressure of the combustion chamber in a non-combustion state on the basis of the corrected cylinder pressure before a spark ignition timing and on the basis of the derived volume of the combustion chamber; motoring effective pressure deriving means for deriving a motoring indicated mean effective pressure of the combustion chamber in non-combustion state on the basis of the predicted motoring pressure; and misfire occurrence deciding means for deciding an occurrence of misfire on the basis of the motoring indicated mean effective pressure and on the basis of the indicated mean effective pressure.

According to another aspect of the present invention, a system for detecting combustion state in an internal combustion engine, comprises: cylinder pressure detecting means for monitoring a cylinder pressure in a combustion chamber of the engine to produce a cylinder pressure indicative signal; crank angle detecting means for monitoring an angular position of a crankshaft to produce a crank angle indicative signal; sampling means for sampling the cylinder pressure indicative signal at every predetermined crank angle for a sampling period in which the crankshaft is positioned within a predetermined range of crank angle, on the basis of the crank angle indicative signal; volume deriving means for deriving volume of the combustion chamber at every predetermined crank angle; bias quantity deriving means for deriving bias quantity used for biasing the cylinder pressure indicative signal, on the basis of the derived volume of the combustion chamber for the sampling period, and on the basis of the sampled cylinder pressure indicative signals; cylinder pressure correcting means for correcting the sampled cylinder pressure indicative signals on the basis of the derived bias quantity; peak position determining means for determining a peak position of cylinder pressure on the basis of the corrected cylinder pressure; heat generation quantity deriving means for deriving a heat generation quantity of the engine on the basis of the decided peak position, the corrected cylinder pressure and the derived volume of the combustion chamber; and workload deriving means for deriving a workload value of the engine on the basis of the derived heat generation quantity and the determined peak position.

According to another aspect of the present invention, a system for detecting combustion state in an internal combustion engine, comprises: crank angle detecting means for monitoring an angular position of a crankshaft to produce a crank angle indicative signal; cylinder pressure detecting means for detecting cylinder pressures in a combustion chamber for a predetermined detecting range of crank angle; cylinder pressure predicting means for predicting cylinder pressures for a range other than the predetermined detecting range of crank angle in compression and expansion strokes of the engine; and mean effective pressure deriving means for deriving an indicated mean effective pressure on the basis of the detected cylinder pressures and the predicted cylinder pressures.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 5 is a block diagram of the preferred embodiment of a combustion state detecting system, according to the present invention;

FIG. 6 is a flow chart of a program for sampling cylinder pressure data, which is used in a combustion state detecting process performed by the first preferred embodiment of a combustion state detecting system, according to the present invention;

FIG. 7 is a flow chart of a main operation routine, which is used in a combustion state detecting process performed by the first preferred embodiment of a combustion state detecting system, according to the present invention;

FIG. 8 is a flow chart of a program for deriving a bias quantity X, which is used as a sub-routine of the main operation routine of FIG. 7;

FIG. 9 is a flow chart of a program for correcting the cylinder pressure, which is used as a sub-routine of the main operation routine of FIG. 7;

FIG. 16 is a flow chart of a program for predicting a cylinder pressure in a compression stroke, which may be substituted for the program of FIG. 10;

FIG. 17 is a flow chart of a program for calculating a polytropic exponent PNE, which may be substituted for the program of FIG. 11;

FIG. 27 is a flow chart of a program for deriving a bias quantity X, which is used as a sub-routine of the main operation routine of FIG. 26;

FIG. 28 is a flow chart of a program for correcting the cylinder pressure, which is used as a sub-routine of the main operation routine of FIG. 26;

DESCRIPTION OF THE PREFERRED EMBODIMENT

Figure 1:
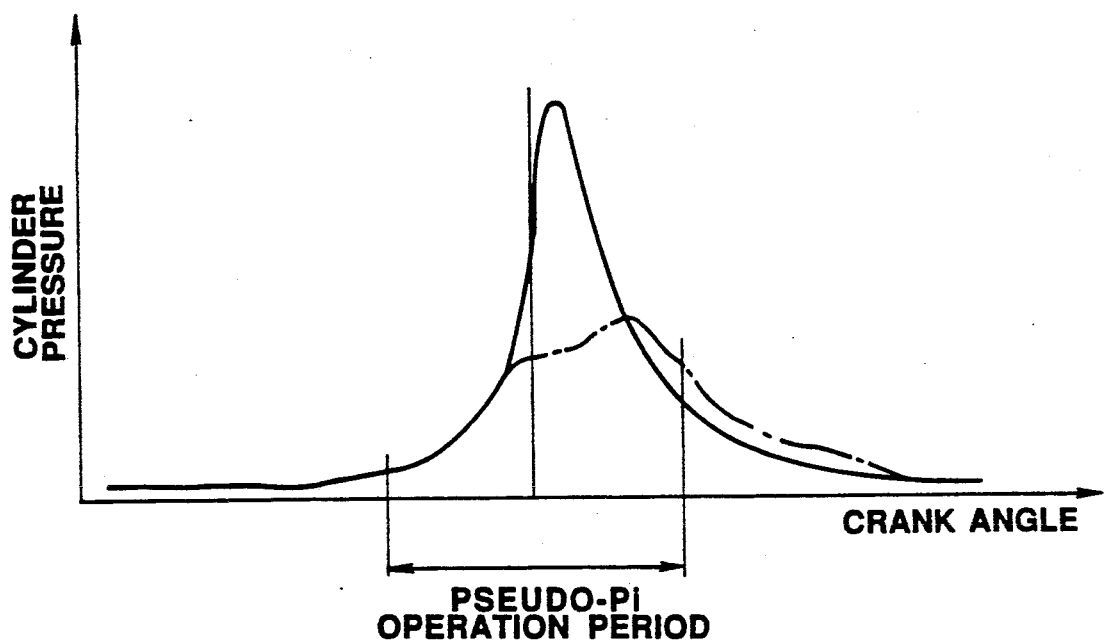
FIG. 1 is a graph showing relationships between cylinder pressure and crank angle, in normal and bad combustion states.
Figure 2:
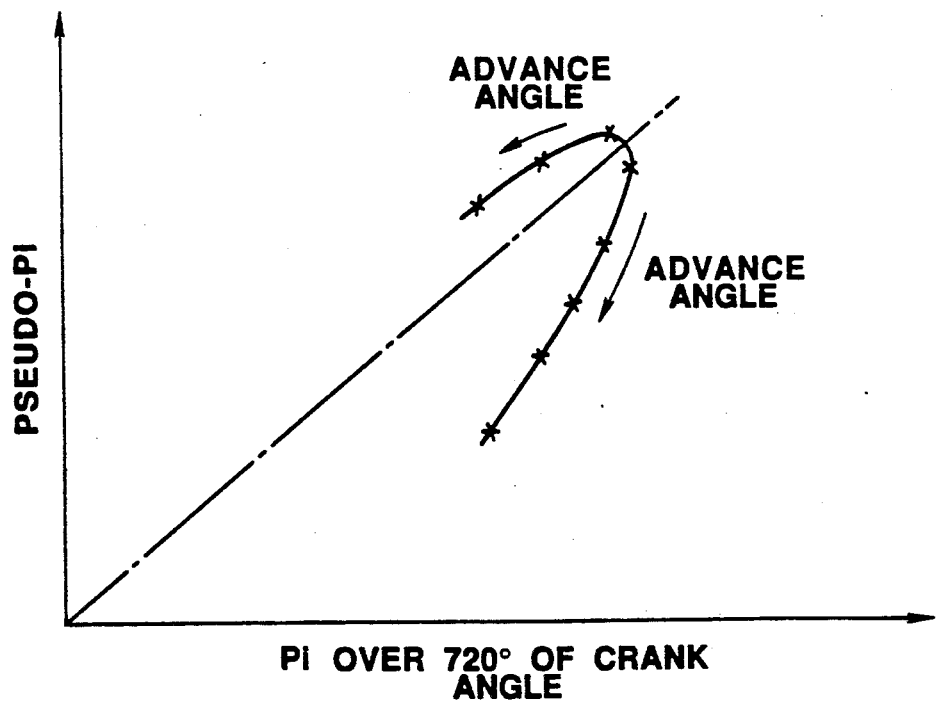
FIG. 2 is a graph showing relationships between pseudo-Pi for a predetermined period of time and Pi for an interval of 720°, in normal and bad combustion state.
Figure 3:
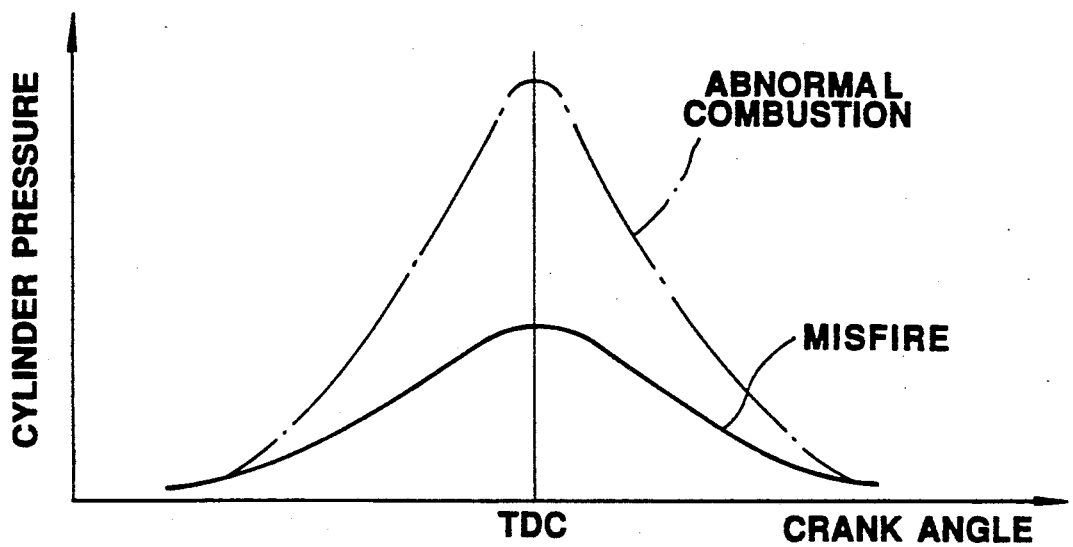
FIG. 3 is a graph showing relationships between cylinder pressure and crank angle, when misfire occurs and combustion state is abnormal.
Figure 4:
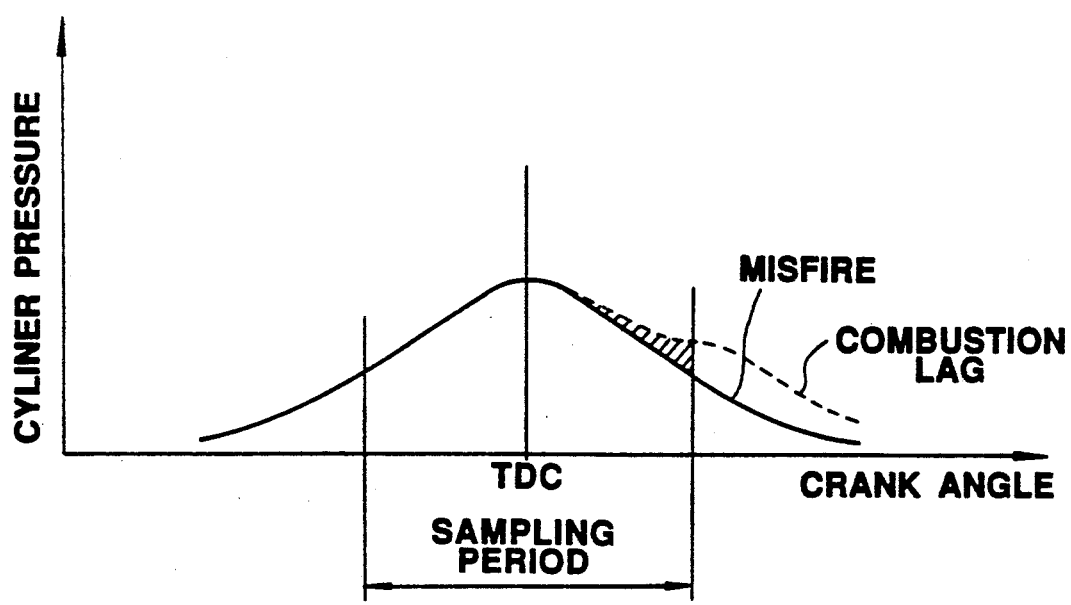
FIG. 4 is a graph showing relationships between cylinder pressure and crank angle, when misfire occurs and when combustion is greatly delayed.

Referring now to the drawings, particularly to FIG. 5, there is shown the preferred embodiment of a combustion state detecting system, according to the present invention.

As shown in FIG. 5, the combustion state detecting system includes a plurality of cylinder pressure sensors 1 to 6 serving as cylinder pressure detecting means for detecting cylinder pressures in combustion chambers for their respective cylinders. These cylinder pressure sensors 1 to 6 have piezoelectric devices, by which the cylinder pressures are converted into charge signals to be output to charge amplifiers 7 to 12. By means of the charge amplifier 7 to 12, the charge signals are converted into voltage signals to be output to a multiplexer 13.

The multiplexer 13 is designed to output the detection signal of any one of the cylinder pressure sensors 1 to 6, which is selected on the basis of a switching signal which will be described hereinafter, to an I/O interface 16 of a control unit 15 via a low-pass filter 14. The low-pass filter 14 is designed to remove high-frequency components, such as knocking vibrations and/or ignition noises, which are not required for detecting cylinder pressure and which cause false detection, and to pass only low-frequency components less than a predetermined frequency.

The control unit 15 has CPU 17, ROM 18, RAM 19 and A/D converter 20. The CPU 17 may read required external data from the I/O interface 16 in accordance with programs written in the ROM 18, and perform data transfer from and to the RAM 19 to calculate values which are required for deriving parameters with respect to combustion states, to output the processed data to the I/O interface 16, if necessary. The I/O interface 16 may receive signals which are output from the low-pass filter 14, a crank angle sensor 21 serving as crank angle detecting means and an air flow meter 22, and outputs a switching signal to the multiplexer 13 in accordance with commands from the CPU 17.

The A/D converter 20 is designed to convert the external signals which are input to the I/O interface 16, from analog to digital. In addition, the ROM 18 may store programs of the CPU 17 therein, and the RAM 19 may store data used for calculation or the like, as, for example, a map or other such form.

The crank angle sensor 21 is provided for monitoring the angular position of a crankshaft to produce a crank angle reference signal REF at every predetermined angular position before top-dead-center (BTDC) position of the crankshaft, for an interval of a predetermined crank angle, e.g. 120° in the case of a six-cylinder engine, and a crank position signal POS at every given angular displacement, e.g. 1°. Therefore, the engine revolution speed can be derived on the basis of the crank angle reference signal or the crank position signal. In addition, the air flow meter 22 is designed to output signals corresponding to the intake air flow rate.

Referring to FIGS. 6 to 20, there is shown a combustion state detecting process performed by the first preferred embodiment of a combustion state detecting system, according to the present invention.

In this embodiment, the CPU 17 serves as sampling means, combustion chamber volume setting means, bias quantity setting means, cylinder pressure correcting means, cylinder pressure predicting means and mean effective pressure deriving means.

FIG. 6 shows a flow chart of a program for sampling cylinder pressure data. This program is executed by the control unit 15 at every predetermined angular position, e.g. at every 60° before compression top-dead-center (BTDC) of the crankshaft, determined by the crank angle reference signal REF and the crank position signal POS.

First of all, at step 601, cylinder pressures which are detected by the cylinder pressure sensors 1 to 6 for the respective cylinders at every predetermined crank angle, e.g. at every 4° of crank angle, are converted from analog to digital by means of A/D converter 20 to be read. Then, at step 602, cylinder pressures $PE_{ij}$ which are read for the respective cylinder number i and for the respective sampled order j corresponding to the sampled angular position of the crankshaft, are stored in the RAM 19. In other words, a value $j=1$ is 4° of crank angle, $j=2$ is 8° of crank angle ... etc. In this case, the sampled order j is from 30 (i.e. 60° BTDC) to 60 (i.e. 60° ATDC). At step 603, it is determined whether or not it is a timing at which A/D conversion should be ended, i.e. whether or not the crankshaft is positioned at 60° after compression top-dead-center (ATDC) position. When NO at step 603, the routine returns to step 601. On the other hand, when YES, the routine goes to step 604 in which an operation flag, which will be described hereinafter, is set to 1. Then, at step 605, it is determined whether or not it is a timing at which the next A/D conversion should be started. When NO, the routine returns to step 605, and when YES, the routine goes to step 606 in which the cylinder number i is incremented by 1. Thereafter, at step 607, it is determined whether or not the cylinder number i becomes 6. When NO, the routine ends, and when YES, the routine goes to step 608. Finally, at step 608, the cylinder number i is set to zero and the routine ends. In this way, the cylinder pressures $PE_{ij}$ are detected for the respective cylinders from 60° BTDC position to 60° ATDC position of the crankshaft.

FIG. 7 shows a flow chart of a main operation program executed by the control unit 15.

First, at step 701, it is determined whether or not the aforementioned operation flag is 1. When YES, the routine goes to step 702, and when NO, the routine ends. Then, at step 702, a polytropic exponent PN of a compression stroke is retrieved from a map. This polytropic exponent PN is generally set to about 1.3. At step 703, a bias quantity X is calculated in accordance with the flow chart of FIG. 8 which will be described hereinafter. At step 704, the cylinder pressure $PE_{ij}$ is corrected by using the bias quantity X in accordance with the flow chart of FIG. 9 which will be described hereinafter, and the corrected cylinder pressure $P_{ij}$ (j=30~60) is stored in the RAM 19. At step 705, cylinder pressures $P_{ij}$ at j=0~29, i.e. at 0°~116° of crank angle on the basis of the starting timing of compression stroke, are predicted in accordance with the flow chart of FIG. 10 which will be described hereinafter. At step 706, a polytropic exponent PNE in an expansion stroke is calculated in accordance with the flow chart of FIG. 11 which will be described hereinafter. At step 707, cylinder pressures $P_{ij}$ at i=61~90, i.e. at 244°~360° of crank angle on the basis of the starting timing of compression stroke, are predicted in accordance with the flow chart of FIG. 12 which will be described hereinafter. At step 708, a component $P_i+i$ of the total cylinder pressure $P_i$ for one engine cycle is calculated to be predicted in accordance with the flow chart of FIG. 13 which will be described hereinafter. Finally, at step 709, the operation flag is set to zero, and then, the routine ends.

With reference to FIG. 8, a process for deriving a bias quantity X is described below.

First, at step 801, cylinder pressures $PE_{ix}$ and $PE_{iy}$ which are detected at two crank angles x and y before the spark timing for the same cylinder, are read out of the RAM 19. At these crank angles x and y, it can be assumed that an adiabatic change occurs in the cylinder. At step 802, volumes VX and VY of compression chamber at the timings (crank angles) x and y are retrieved from a map. At step 803, a coefficient A is calculated from the retrieved volumes VX and VY of compression chamber and the polytropic exponent PN in accordance with the following equation.

$$A=(VX/VY)^{PN}.$$

At step 804, a bias quantity X is calculated in accordance with the following equation.

$$X=(PE_{ij} \times A - PE_{ix})/(1-A).$$

Figure 14:
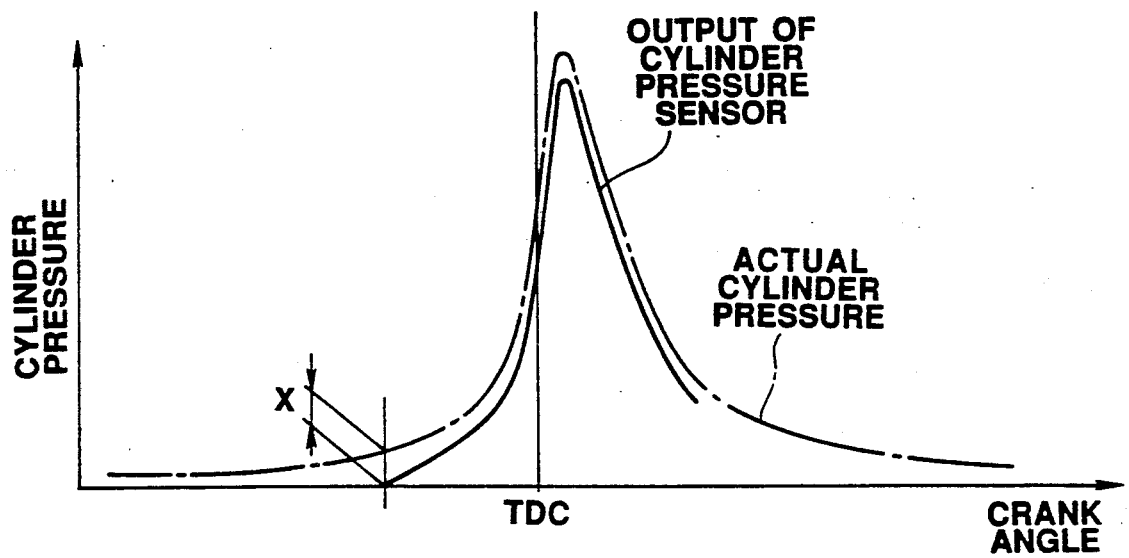
FIG. 14 is a graph showing relationships of the detected cylinder pressure and the actual cylinder pressure relative to crank angle.

As shown in FIG. 14, the detected cylinder pressures which are output values of the cylinder pressure sensors 1 to 6, tend to deviate from the actual cylinder pressures in the combustion chambers. Specifically, in a case where cylinder pressure sensors are mounted on spark plug washers, output values of the cylinder pressure sensors tend to vary due to variations of circumference temperature and so forth. For that reason, in this embodiment of the present invention, the coefficient A which corresponds to variations of actual cylinder pressure in an adiabatic change, is calculated from the volumes VX and VY of the combustion chamber at two crank angles and the polytropic exponent PN, and then, the bias quantity X (see FIG. 14) is calculated from the coefficient A and from the cylinder pressures detected by means of the cylinder pressure sensors 1 to 6, so that the actual cylinder pressure can be detected. Since the bias quantity X varies at every cycle due to start-up and warming-up of the engine, engine load and so forth, the bias quantity X is always calculated in this embodiment of the present invention.

Figure 15:
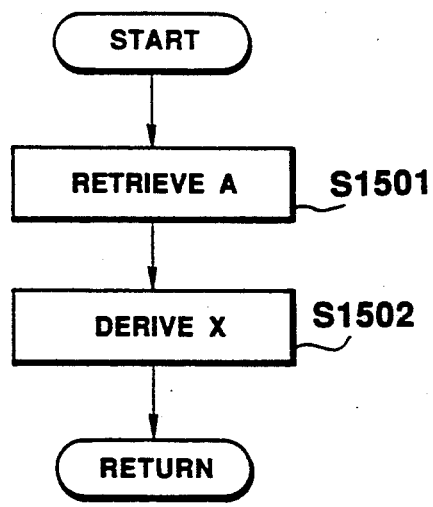
FIG. 15 is a flow chart of a program for deriving a bias quantity X, which may be substituted for the program of FIG. 8.
Figure 18:
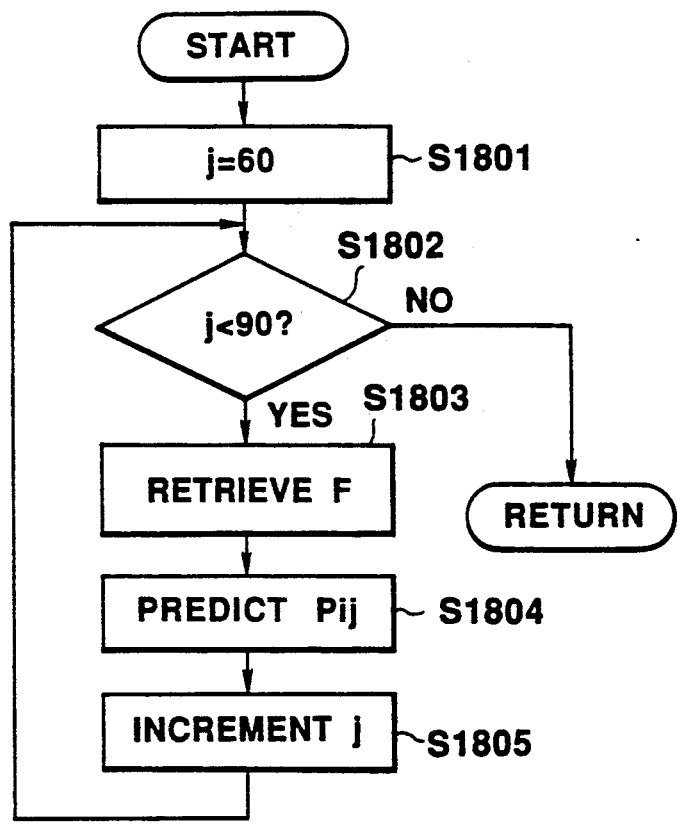
FIG. 18 is a flow chart of a program for predicting a cylinder pressure in an expansion stroke, which may be substituted for the program of FIG. 12.

Furthermore, in a case where volumes of combustion chamber at two predetermined crank angles are used, a program of FIG. 15 may be substituted for the program of FIG. 8. In this case, the coefficient A is retrieved from a map at step 1501, and then, the bias quantity X is calculated in accordance with the aforementioned equation at step 1502.

Next, a process for correcting the cylinder pressure in accordance with the program of FIG. 9 is described below.

First, at step 901, the initial value of j is set to 30. At step 902, it is determined whether or not j is smaller than 61. When YES, the routine goes to step 903, and when NO, the routine ends. At step 903, the bias quantity X is added to the detected cylinder pressure $PE_{ij}$ to derive a corrected cylinder pressure $P_{ij}$, and this corrected cylinder pressure $P_{ij}$ is stored in the RAM 19. At step 904, the value of j is incremented by 1, and then routine ends. In this way, the cylinder pressure $P_{ij}$ is sequentially corrected from j=30 to j=60.

Figure 10:
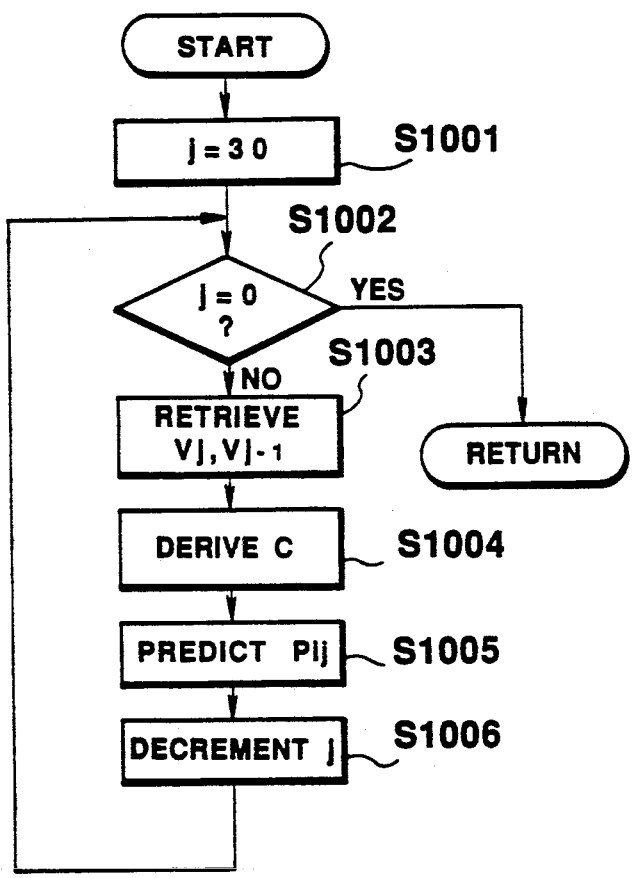
FIG. 10 is a flow chart of a program for predicting a cylinder pressure in a compression stroke, which is used as a sub-routine of the main operation routine of FIG. 7.

Next, a process for predicting a cylinder pressure in a compression stroke in accordance with the program of FIG. 10 is described below.

First, at step 1001, the initial value of j is set to 30. Then, at step 1002, it is determined whether or not the value of j becomes zero. When YES, the routine ends, and when NO, the routine goes to step 1003. At step 1003, volumes $V_j$ and $V_{j-1}$ of combustion chamber are retrieved from a map in which the volumes $V_j$ and $V_{j-1}$ are stored in relation to predetermined crank angles. At step 1004, a coefficient C is calculated from the volumes $V_j$ and $V_{j-1}$ and the polytropic exponent PN in accordance with the following equation.

$$C=(V_j/V_{j-1})^{PN}.$$

Then, at step 1005, a cylinder pressure $P_{i(j-1)}$ at a crank angle which is smaller than that of the cylinder pressure $P_{ij}$ by a predetermined crank angle, is calculated, to be predicted from the cylinder pressure $P_{ij}$ which is corrected at j=30 or predicted in the preceding routine, in accordance with the following equation.

$$P_{i(j-1)}=P_{ij} \times C.$$

Finally, at step 1006, the value of j is decreased by 1, and then, the routine returns to step 1002. In this way, the cylinder pressures $P_{i(j-1)}$ are predicted from j=30 to j=0 to be stored in the RAM 19.

Furthermore, a program of FIG. 16 may be substituted for the program of FIG. 10. The program of FIG. 16 is same as that of FIG. 10 except that step 1603 is substituted for steps 1003 and 1004. That is, at step 1603, the coefficient C is retrieved from a map in which the coefficients C are preset in relation to the value of j, i.e. to the crank angle.

Figure 11:
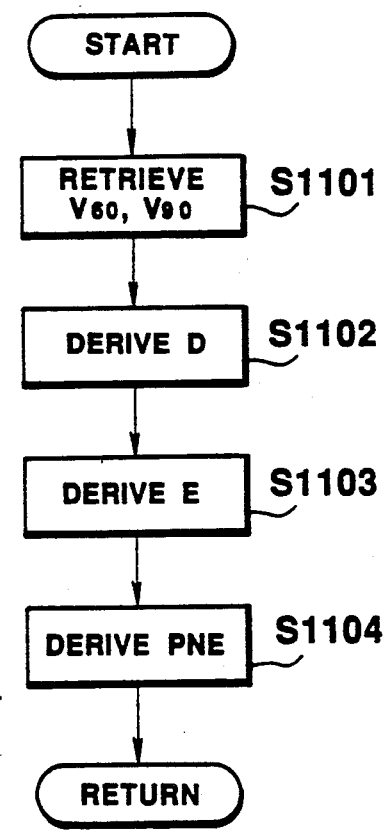
FIG. 11 is a flow chart of a program for calculating a polytropic exponent PNE, which is used as a sub-routine of the main operation routine of FIG. 7.

Next, a process for calculating a polytropic exponent PNE in an expansion stroke in accordance with the program of FIG. 11, is described below.

First, at step 1101, a volume $V_{60}$ of a combustion chamber at 60° after compression stroke top-dead-center (ATDC), i.e. at 240° of crank angle on the basis of the starting timing of the compression stroke, and a volume $V_{90}$ of combustion chamber at the expansion stroke bottom-dead-center (BDC), i.e. at 360° of crank angle on the basis of the starting timing of the combustion stroke, are retrieved from a map on the basis of the crank angle. At step 1102, a coefficient D is calculated on the basis of the retrieved volumes $V_{60}$ and $V_{90}$ of combustion chamber in accordance with the following equation.

$$D=\log(V_{90}/V_{60}).$$

Then, at step 1103, a coefficient E is calculated from the detected cylinder pressure $P_{i60}$ at 60° ATDC and a predetermined cylinder pressure $P_{FIX}$ in accordance with the following equation.

$$E = \log(P_{i60}/P_{FIX}).$$

The reason the cylinder pressure at a 360° angular position of the crankshaft is set to a constant $P_{FIX}$ is that, since the exhaust valve is open at this crank angle, there is no problem if the cylinder pressure at this crank angle is assumed to be constant in spite of engine running condition. Finally, at step 1104, a polytropic exponent PNE ($=E/D$) is calculated. Furthermore, the program of FIG. 17 may be substituted for the program of FIG. 11. In this case, the coefficient D is retrieved from a map at step 1701, and then, at step 1702, the coefficient E is retrieved from a map in which the coefficient E is set in accordance with the cylinder pressure $P_{i60}$.

Figure 12:
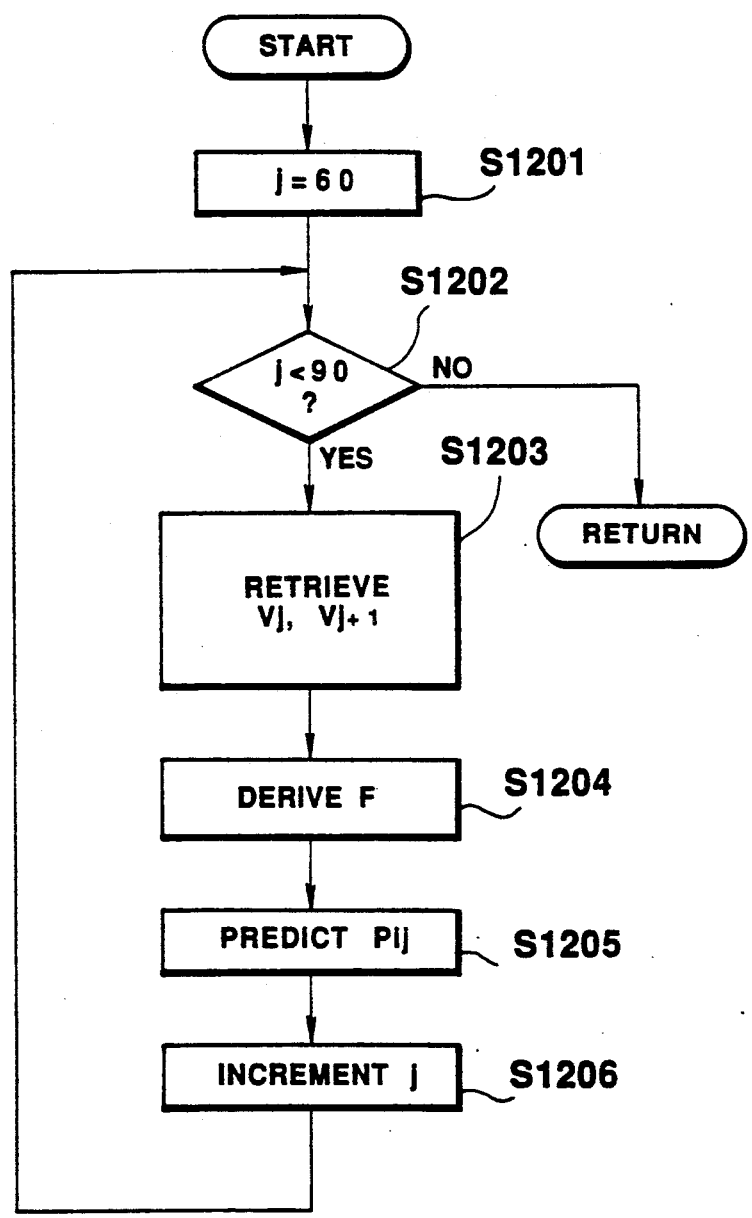
FIG. 12 is a flow chart of a program for predicting a cylinder pressure in an expansion stroke, which is used as a sub-routine of the main operation routine of FIG. 7.

Next, a process for predicting cylinder pressure in an expansion stroke in accordance with the program of FIG. 12, is described below.

First of all, at step 1201, the initial value of j is set to 60. At step 1202, it is determined whether or not the number of j is smaller than 90. When YES, the routine goes to step 1203, and when NO, the routine ends. At step 1203, volumes $V_j$ and $V_{j+1}$ of combustion chamber are retrieved from a map on the basis of the crank angle. At step 1204, a coefficient F is calculated from the volumes $V_j$ and $V_{j+1}$ of combustion chamber and the polytropic exponent PNE in accordance with the following equation.

$$F = (V_j/V_{j+1})^{PNE}.$$

Then, at step 1205, a cylinder pressure $P_{i(j+1)}$ at a greater crank angle than that of the cylinder pressure $P_{ij}$ by a predetermined crank angle, is calculated to be predicted from the cylinder pressure $P_{ij}$ which is corrected as $j=60$ or which is predicted in the preceding routine, and the coefficient F, in accordance with the following equation.

$$P_{i(j+1)} = P_{ij} \times F.$$

Finally, at step 1206, the number of j is incremented by 1, and the routine returns to step 1202. In this way, the cylinder pressures $P_{i(j+1)}$ are predicted from $j=60$ to $j=90$, to be stored in the RAM 19. Furthermore, the program of FIG. 18 may be substituted for the program of FIG. 12. This program is same as that of FIG. 12 except that step 1803 is substituted for steps 1203 and 1204. That is, in the program of FIG. 18, the coefficient F is retrieved from a map at step 1803.

Figure 13:
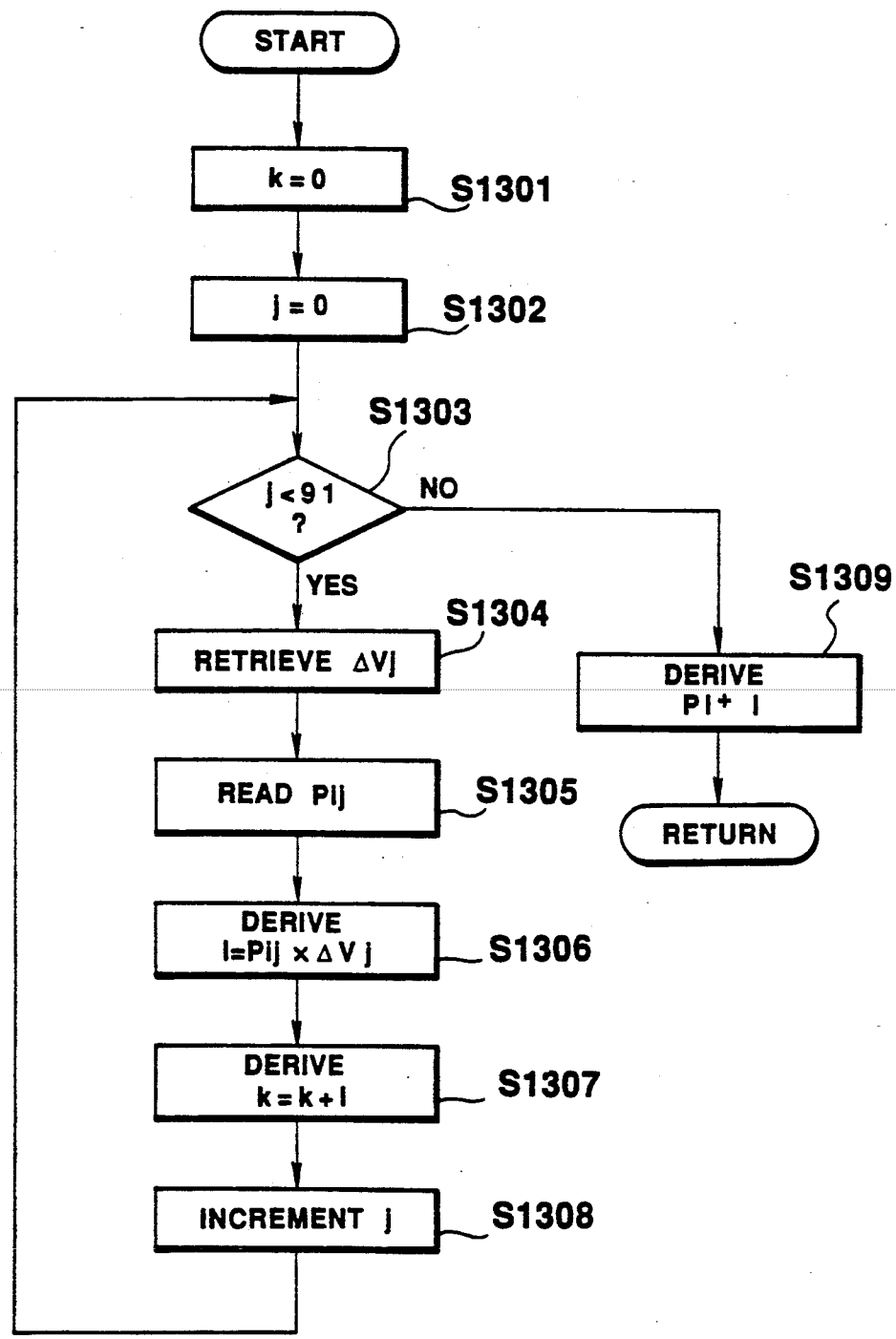
FIG. 13 is a flow chart of a program for calculating a component $P_i+i$, which is used as a sub-routine of the main operation routine of FIG. 7.

Next, a process for calculating a component $P_i + i$ of the total cylinder pressure $P_i$ for one engine cycle in accordance with the program of FIG. 13, is described below.

First, the initial value of total workload k is set to zero at step 1301, and the initial value of j is set to zero at step 1302. Then, at step 1303, it is determined whether or not the value of j is smaller than 91. When YES, the routine goes to step 1304, and when NO, the routine goes to step 1309. At step 1304, a variation $\Delta V_j$ of the volume of a combustion chamber for a cylinder pressure sampling period, e.g. for an interval of 4° of crank angle, is retrieved from a map on the basis of the value of j. At step 1305, the corrected or predicted cylinder pressure $P_{ij}$ is read out of the RAM 19. At step 1306, a partial workload 1 is derived by multiplying the retrieved variation $\Delta V_j$ of volume of combustion chamber by the read cylinder pressure $P_{ij}$. At step 1307, new total workload k is derived by adding the derived partial workload 1 to the total workload k which is set in the preceding routine. At step 1308, the value of j is incremented by 1, and then, the routine returns to step 1303. In this way, the total workload k from $j=0$ to $j=90$, i.e. from 0° to 360° of crank angle (both of the compression stroke and the expansion stroke) may be derived. On the other hand, at step 1309, the component $P_i + i$ is calculated to be predicted for the respective cylinders on the basis of the total workload k from 0° to 360° of crank range, in accordance with the following equation.

$$P_i + i = k/V_s$$

in which $V_s$ is a total volume of the combustion chamber from 0° to 360° of crank angle.

As mentioned above, in this embodiment, the cylinder pressures detected by the cylinder pressure sensors 1 to 6 are read from 120° to 240° of crank angle, i.e. from 60° BTDC position to 60° ATDC position of the crankshaft. Then, on the basis of these read cylinder pressures, cylinder pressures are predicted for intervals of 120° before and after the aforementioned range of crank angle (from 120° to 240° of crank angle). Finally, on the basis of these predicted cylinder pressures, the component $P_i + i$ are calculated. Therefore, there is advantages as follows.

That is, since the cylinder pressures detected by the cylinder pressure sensor 1 to 6 for the respective cylinders are read for intervals of 120° on the basis of TDC, it is possible to timely detect cylinder pressures for the respective cylinders (6 cylinders) without a high-speed A/D converter and a high-speed CPU. In this embodiment, the sampling period of time was set to 120° of crank angle for a combustion state detecting system applied to a 6-cylinder engine. However, according to the present invention, the sampling period of time may be set to 720° divided by the number of cylinders.

Figure 19:
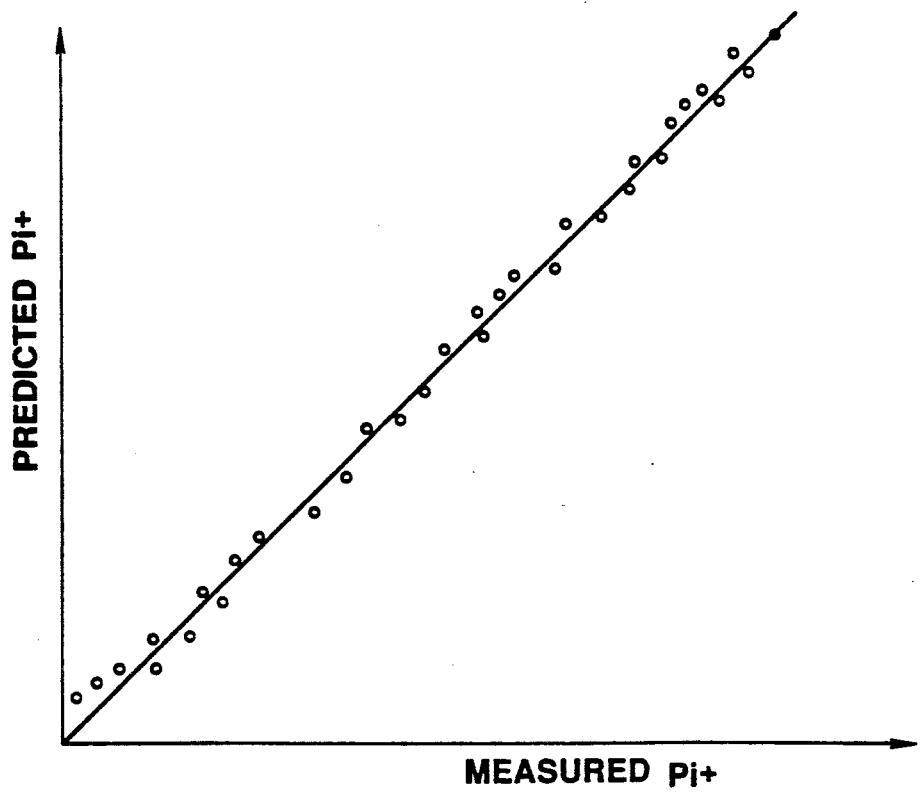
FIG. 19 is a graph showing a relationship between the measured and predicted values of a component $P_i+$.
Figure 20:
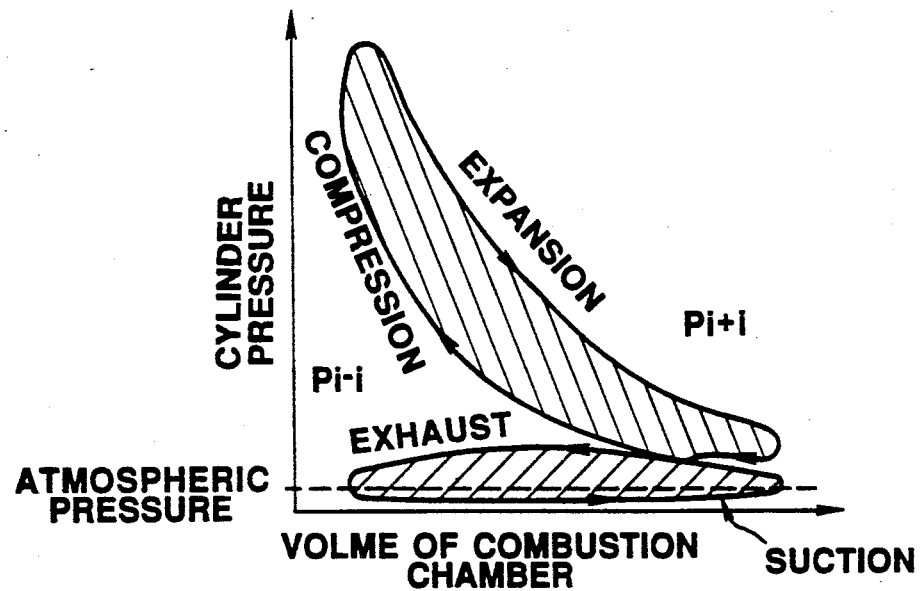
FIG. 20 is a graph showing a relationship between cylinder pressure and volume of a combustion chamber.

In addition, since the detected cylinder pressures of the cylinder pressure sensors 1 to 6 are corrected by means of the bias quantity X, it is possible to accurately detect actual cylinder pressure of the combustion chamber, so that detection accuracy of the component $P_i + i$ can be greatly improved as shown in FIG. 19. Moreover, since the component $P_i + i$ for an interval of 360° of crank angle in both of compression and expansion strokes of the total cylinder pressure $P_i$ for one engine cycle is derived on the basis of the corrected cylinder pressure and the predicted cylinder pressure, the component $P_i + i$ can be accurately detected if combustion state becomes worse and the combustion period becomes long (see the chain line of FIG. 1). The total cylinder pressure $P_i$ for one engine cycle is the total of the component $P_i + i$ in the compression and expansion strokes, and the component $P_i - i$ in the intake and exhaust strokes, as shown in FIG. 20. The component $P_i - i$ is determined by engine running condition, engine characteristics and so forth. On the other hand, the component $P_i + i$ corresponds to the combustion state. Therefore, in this embodiment of the invention, the component $P_i + i$ is used for detecting combustion state in the engine.

The first preferred embodiment of a combustion state detecting system, according to the present invention, can be applied for detecting occurrence of misfire. FIGS. 21 to 24 show various processes for detecting an occurrence of misfire, according to the present invention.

Figure 21:
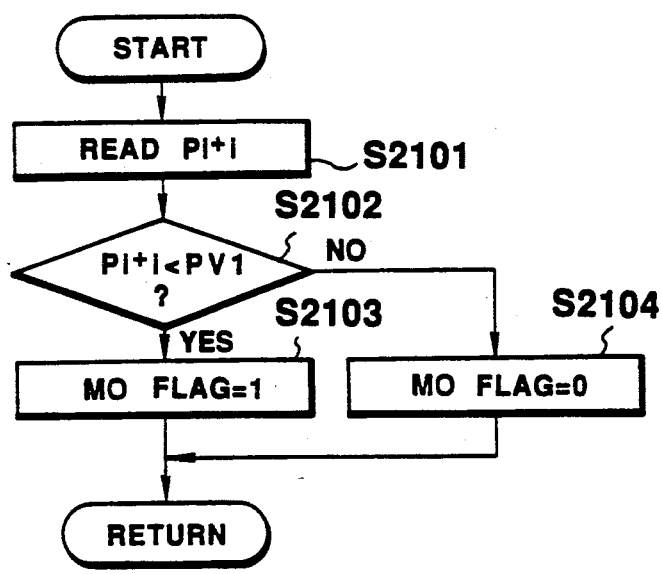
FIGS. 21 to 24 are flow charts of programs for detecting an occurrence of misfire performed by the first preferred embodiment of a combustion state detecting means, according to the present invention.

First, the misfire detecting process of FIG. 21 is described below.

At step 2101, the component $P_i+i$ calculated at step 1309 is read. Then, at step 2102, it is determined whether or not the read component $P_i+i$ is smaller than a predetermined value PV1. When YES, the routine goes to step 2103, and when NO, the routine goes to step 2104. At step 2103, a misfire occurrence flag (MO flag) is set to 1 which indicates occurrence of misfire, to be stored in the RAM 19. On the other hand, at step 2104, the misfire occurrence flag is set to zero which indicates absence of misfire, to be stored in the RAM 19. In this way, it is determined whether or not misfire occurs for the respective cylinders. According to this process, it is possible to greatly improve the detection accuracy of occurrence of misfire since the component $P_i+i$ can be accurately predicted in accordance with the actual cylinder pressure $P_i$.

Figure 22:
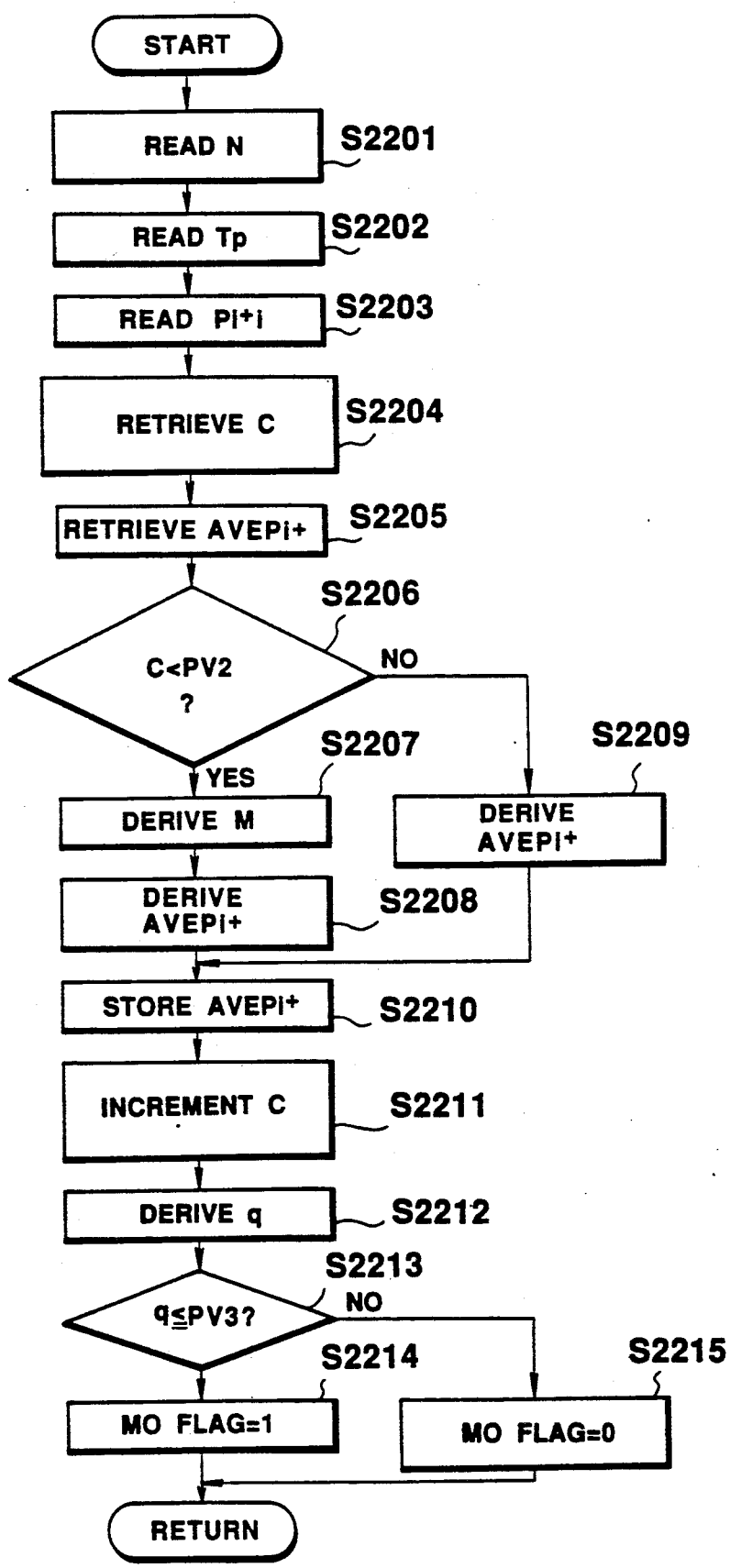

Next, the misfire detecting process of FIG. 22 is described below.

First, the detected engine revolution speed is read at step 2201, a basic fuel injection amount Tp corresponding to the engine load (=KQ/N, K: constant, Q: intake air flow rate, N: engine revolution speed) is read at step 2202, and the component $P_i+i$ derived at step 1309 is read at step 2203. Then, at step 2204, a learning value C representing a number of times for reading $P_i+i$ for determining an average pressure $AVEP_i+$, is retrieved from a map in accordance with the detected engine revolution speed, the basic fuel injection amount Tp and the number of cylinders. The learning value C is stored in the RAM 19 for the respective cylinders in accordance with the engine revolution speed and the basic fuel injection amount Tp, in other words the value of C varies dependent upon the engine revolution speed and the injection amount Tp. At step 2205, an average value $AVEP_i+$ of the component $P_i+i$ is retrieved from a map in accordance with the engine revolution speed, the basic fuel injection amount Tp and the number of cylinder. The average value $AVEP_i+$ is stored in the RAM 19 for the respective cylinders in accordance with the engine revolution speed and the basic fuel injection amount Tp. At step 2206, it is determined whether or not the retrieved learning value C is smaller than a predetermined value PV2. When YES, the routine goes to step 2207, and when NO, the routine goes to step 2209. At step 2207, the learning value C retrieved at step 2204 is multiplied by the average value $AVEP_i+$ retrieved at step 2205, to derive a value M. At step 2208, new average value $AVEP_i+$ is calculated on the basis of the component $P_i+i$ read at step 2203, the aforementioned value M and the learning value C, in accordance with the following simple mean equation.

$$AVEP_i+ = (M = P_i+i)/(C+1)$$

On the other hand, at step 2209, if the value of C is greater than or equal to the predetermined value PV2 a new average value $AVEP_i+$ is calculated in accordance with the following means weighted equation $$AVEP_i+ = AVEP_i+ + (P_i+i - AVEP_i+)/Y$$

in which Y is a value greater than 1. Then, at step 2210, the new average value $AVEP_i+$ derived at step 2208 or 2209 is stored in a map for the respective cylinders in accordance with the engine revolution speed and the basic fuel injection amount Tp. At step 2211, the learning value C is incremented by 1 to be stored in the map. At step 2212, a ratio q ($=P_i+i/AVEP_i+$) of the component $P_i+i$ read at step 2203 to the average value $AVEP_i+$ derived at step 2208 or 2209, is calculated. At step 2213, it is determined whether or not the ratio q is less than or equal to a predetermined value PV3, e.g. 0. When YES, the routine goes to step 2214, and when NO, the routine goes to step 2215. At step 2214, the misfire occurrence flag is set to 1 which indicates an occurrence of misfire, to be stored in the RAM 19. On the other hand, at step 2215, the misfire occurrence flag is set to zero which indicates absence of misfire, to be stored in the RAM 19. In this way, determination for occurrence of misfire is performed for the respective cylinders.

Figure 23:
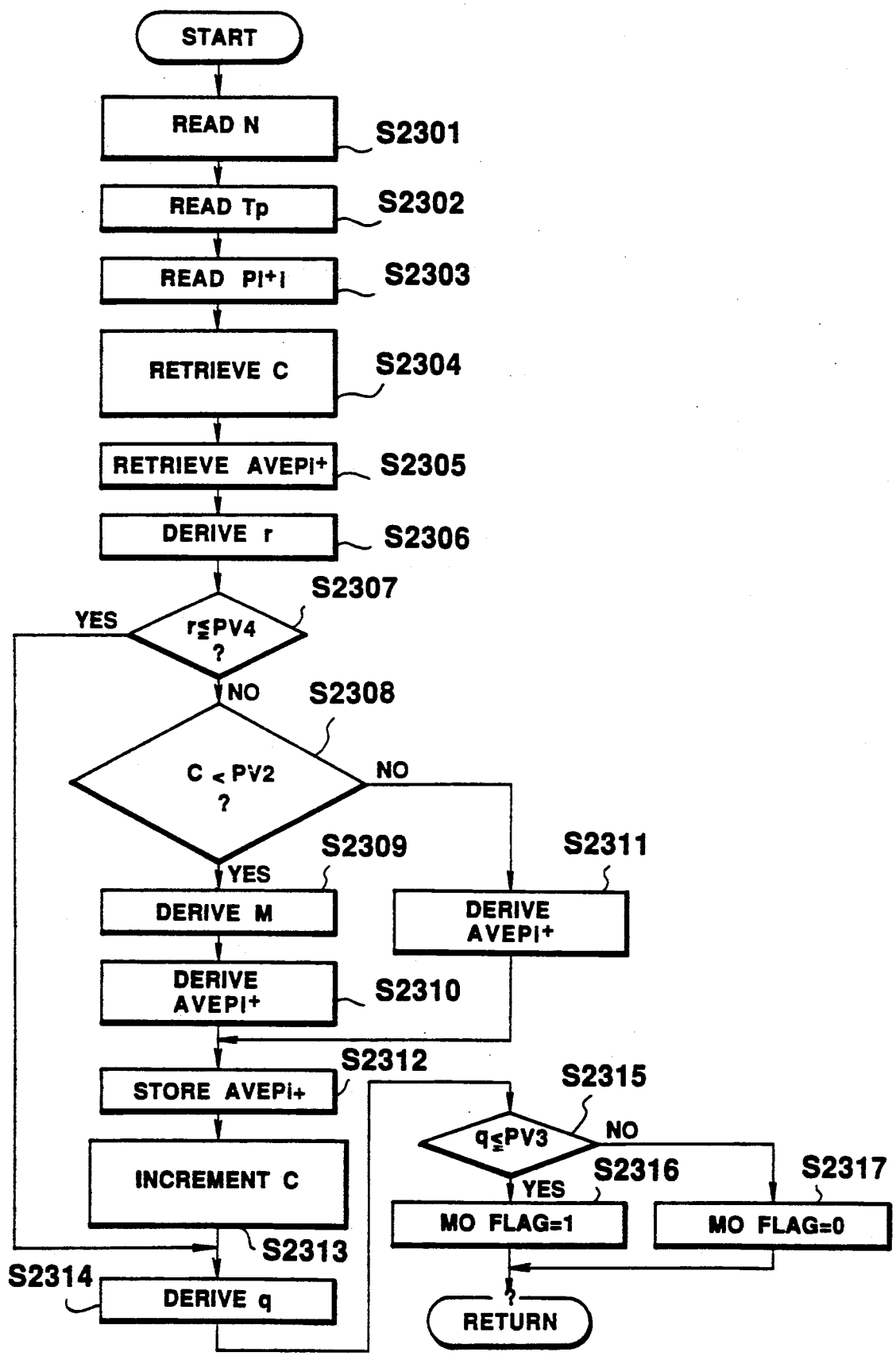

Next, the misfire detecting process of FIG. 23 is described below.

This process is same as that of FIG. 22 except for steps 2306 and 2307. That is, at step 2306 of FIG. 23, a ratio r ($=P_i+i/AVEP_i+$) of the component $P_i+i$ read at step 2303 to the average value $AVEP_i+$ retrieved at step 2305, is calculated. Then, at step 2307, it is determined whether or not the calculated ratio r is smaller than or equal to a predetermined value PV4. When YES, i.e. when the component $P_i+i$ is smaller relative to the average value $AVEP_i+$, the routine bypasses steps 2308 to 2313 to go to step 2314 which is same as step 2212 in the process of FIG. 22. On the other hand, when NO, the routine goes to step 2308 which is same as step 2206 in the process of FIG. 22. In this way, since the average value $AVEP_i+$ is not renewed while the engine running condition having a small component $P_i+i$ (a poor combustion state) continues, the accuracy for detecting an occurrence of misfire can be improved.

Figure 24:
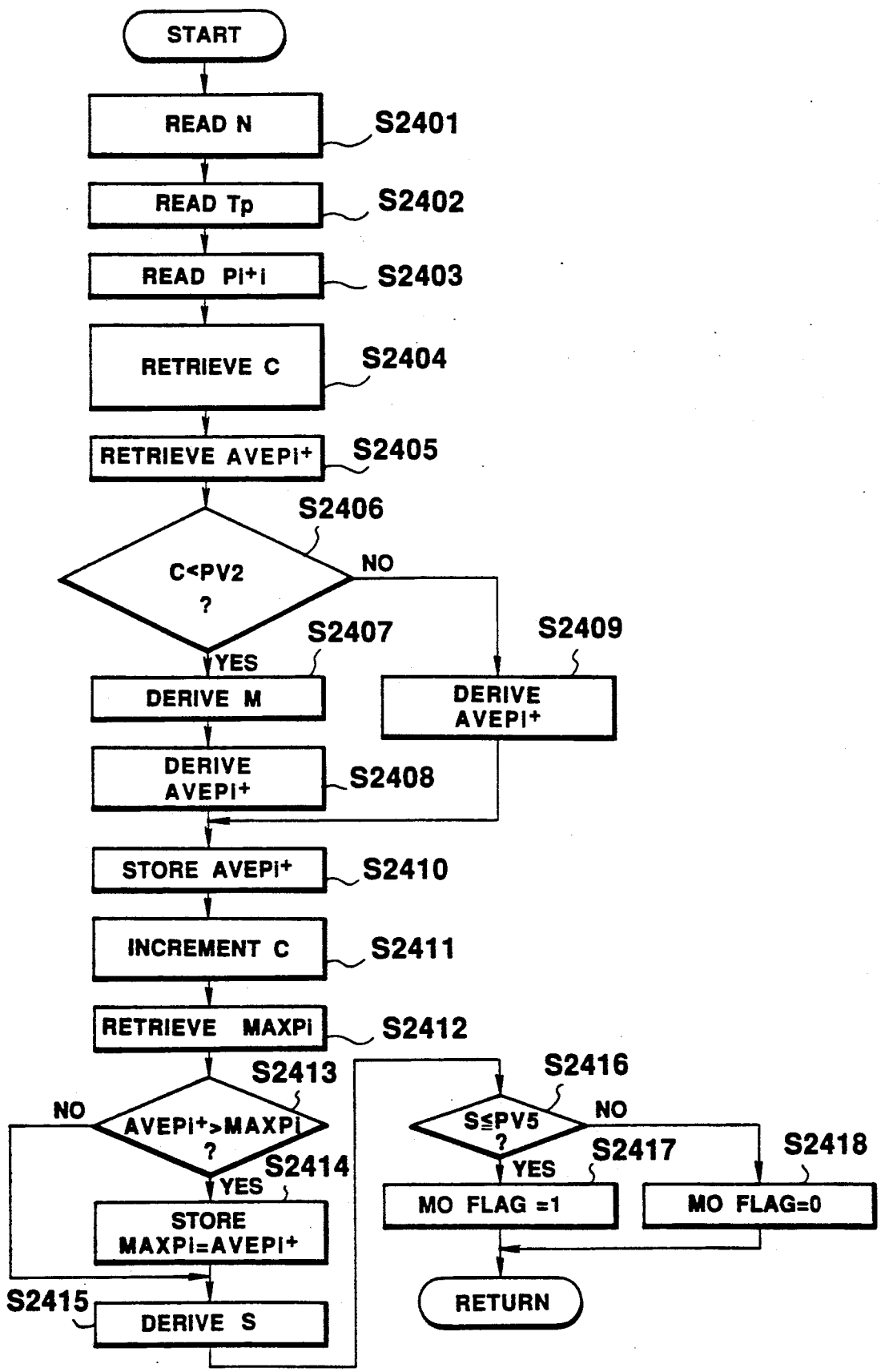

Finally, the misfire detecting process of FIG. 24 is described below.

This process is same as that of FIG. 22 except that steps 2412 to 2416 are substituted for steps 2212 and 2213. That is, in FIG. 24, at step 2412, the maximum value $MAXP_i$ of the average value $AVEP_i+$ is retrieved from a map on the basis of the engine revolution speed and the basic fuel injection amount Tp. The same maximum values $MAXP_i$ for all of cylinders are set in the map in accordance with the engine revolution speed and the basic fuel injection amount Tp. At step 2413, it is determined whether or not the average value $AVEP_i+$ calculated at step 2408 or 2409 is greater than the retrieved maximum value $MAXP_i$. When YES, the routine goes to step 2414, and when NO, the routine goes to step 2415. At step 2414, the calculated $AVEP_i+$ is stored in the map of RAM 19 as the maximum value $MAXP_i$. At step 2415, a ratio S is calculated on the basis of the average value $AVEP_i+$ derived at step 2408 or 2409, the component $P_i+i$ read at step 2403 and the maximum value $MAXP_i$, in accordance with the following equation.

$$S = MAXP_i \times P_i+i / AVEP_i+$$

Then, at step 2416, it is determined whether or not the calculated ratio S is less than or equal to a predetermined value PV5. When YES, it is determined that misfire occurs and the routine goes to step 2417, and when NO, the routine goes to step 2418. In this way, since the same $MAXP_i$ for all of cylinders is set to derive the ratio S from this $MAXP_i$ for the respective cylinders, it is possible to accurately detect occurrence of misfire for the respective cylinders if there is a dispersion in the output values of the cylinder pressure sensors 1 to 6.

Referring to FIGS. 25 to 33, there is shown a combustion state detecting process performed by the second preferred embodiment of a combustion state detecting system, according to the present invention.

In this embodiment, the CPU 17 serves as a sampling means, a combustion chamber volume setting means, a bias quantity setting means, a cylinder pressure correcting means, a peak position determinating means, a generated heat quantity deriving means and a workload deriving means.

Figure 25:
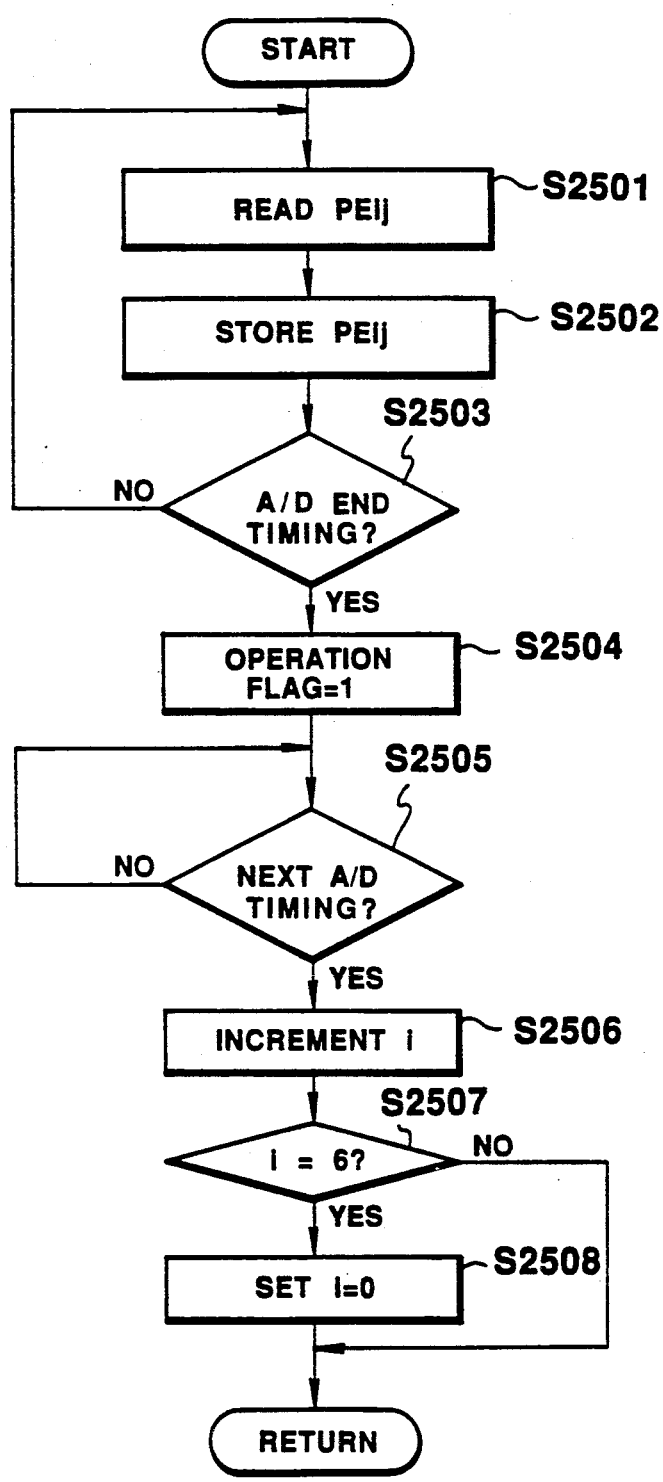
FIG. 25 is a flow chart of a program for sampling cylinder pressure data, which is used in a combustion state detecting process performed by the second preferred embodiment of a combustion state detecting system, according to the present invention.

FIG. 25 shows a flow chart of a program for sampling cylinder pressure data. This program is executed by the control unit 15 at every predetermined angular position, e.g. at every 44° BTDC of the crankshaft, determined by the crank angle reference signal REF and the crank position signal POS. This program is same as that of FIG. 6 except that the sampled order j are numbered from 34 to 64 at step 2502, and that the ending timing of A/D conversion determined at step 2503 is the timing when the crankshaft is positioned at 76° ATDC position. In this way, the cylinder pressures $PE_{ij}$ are detected for the respective cylinders from 44° BTDC position to 76° ATDC position of the crankshaft.

Figure 26:
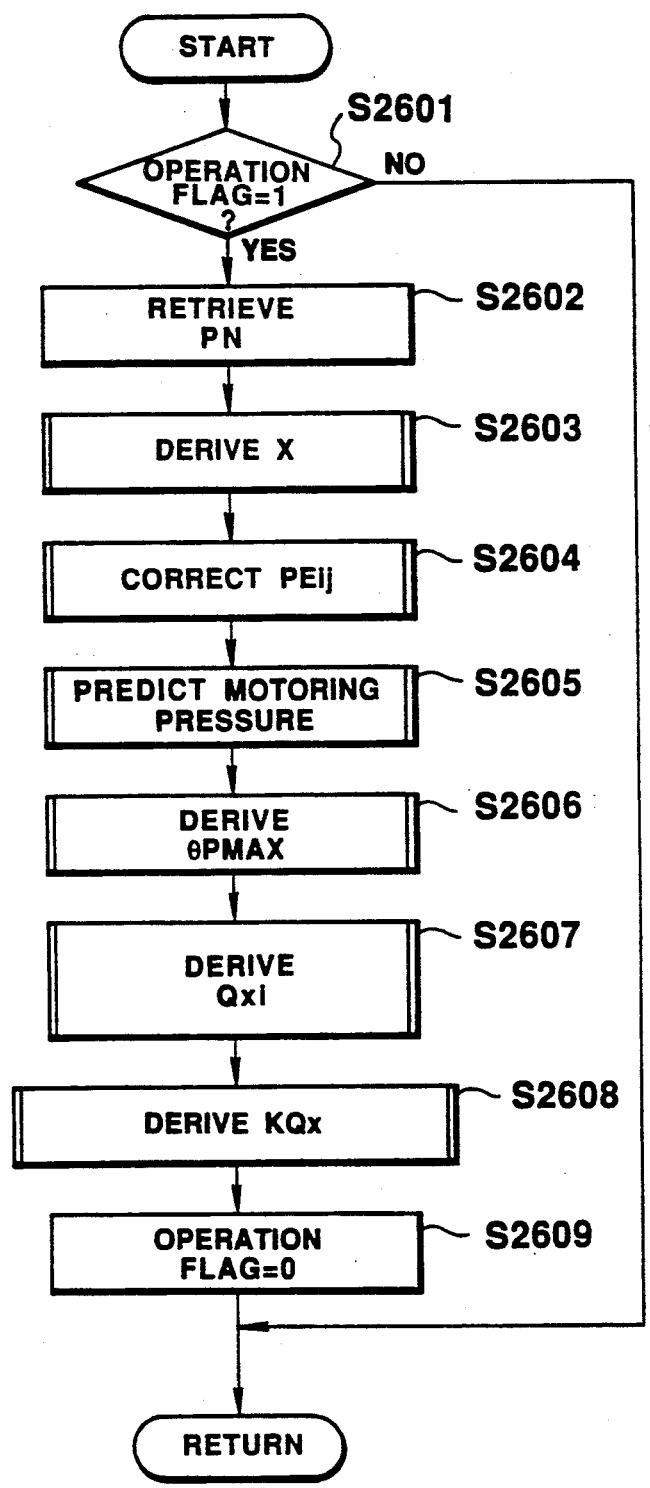
FIG. 26 is a flow chart of a main operation routine, which is used in a combustion state detecting process performed by the second preferred embodiment of a combustion state detecting system, according to the present invention.

FIG. 26 shows a flow chart of a main routine executed by the control unit 15. This routine is same as that of FIG. 7 except that steps 2605 to 2608 are substituted for steps 705 to 708 of FIG. 7, and the respective subroutines differ from that of the first preferred embodiment.

At step 2601, it is determined whether or not the operation flag is 1. When YES, the routine goes to step 2602, and when NO, the routine ends. Then, at step 2602, a polytropic exponent PN in a compression stroke is retrieved from a map. This polytropic exponent PN is generally set to about 1.3. At step 2603, a bias quantity X is calculated in accordance with the flow chart of FIG. 27 which is same as that of FIG. 8 of the first preferred embodiment. At step 2604, the cylinder pressure $PE_{ij}$ is corrected by using the bias quantity X in accordance with the flow chart of FIG. 28 which will be described hereinafter, and the corrected cylinder pressure $P_{ij}$ (j=34~64) is stored in the RAM 19. The reason why the sampled order j of the corrected cylinder pressure $PE_{ij}$ differs from the number (j=30~60) of the first preferred embodiment is that the cylinder pressures $PE_{ij}$ are detected for the respective cylinders from 44° BTDC position to 76° ATDC position in this embodiment. At step 2605, a motoring pressure for a value j of a cylinder in a non-combustion state is calculated to be predicted in accordance with the flow chart of FIG. 29 which will be described hereinafter. At step 2606, a peak position $\theta$PMAX of cylinder pressure is calculated in accordance with the flow chart of FIG. 30. At step 2607, a generated heat quantity $Q_{xi}$ is calculated to be predicted in accordance with the flow chart of FIG. 31 which will be described hereinafter. At step 2608, a value corresponding to workload is calculated to be predicted in accordance with the flow chart of FIG. 32 which will be described hereinafter. Finally, at step 2609, the operation flag is set to zero, and then, the routine ends.

As mentioned above, the process for deriving a bias quantity X in accordance with the program of FIG. 27 is the same as that of FIG. 8 of the first preferred embodiment. Furthermore, in a case where the volumes of respective combustion chambers at two predetermined crank angles are used, the program of FIG. 33 which is same as that of FIG. 15 of the first preferred embodiment, may be substituted for the program of FIG. 27.

Next, a process for correcting the cylinder pressure in accordance with the program of FIG. 28 is described below.

First, at step 2801, the initial value of j is set to 34. At step 2802, it is determined whether or not j is smaller than 65. When YES, the routine goes to step 2803, and when NO, the routine ends. At step 2803, the bias quantity X is added to the detected cylinder pressure $PE_{ij}$ to derive a corrected cylinder pressure $P_{ij}$, and this corrected cylinder pressure $P_{ij}$ is stored in the RAM 19. At step 2804, the value of j is incremented by 1, and then routine ends. In this way, the cylinder pressure $P_{ij}$ is sequentially corrected from j=34 to j=64.

Figure 29:
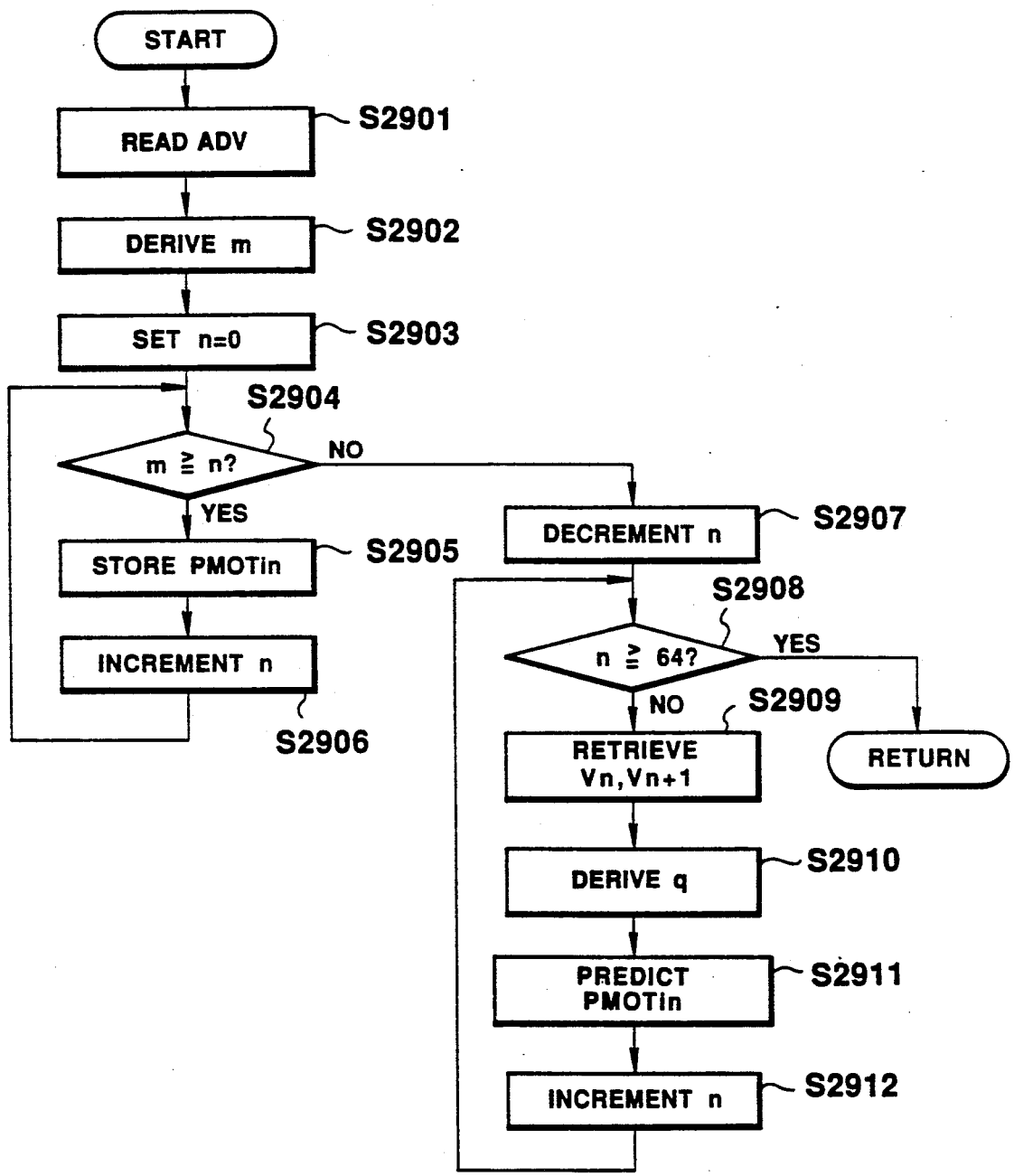
FIG. 29 is a flow chart of a program for predicting motoring pressure in a compression stroke, which is used as a sub-routine of the main operation routine of FIG. 26.

Next, a process for predicting motoring pressure in a compression stroke in accordance with the program of FIG. 29 is described below.

First, at step 2901, a spark ignition timing ADV (BTDC) in an engine cycle in which the cylinder pressure is sampled, is read. At step 2902, a predicted number of times m is calculated on the basis of the read spark ignition timing ADV in accordance with the following equation.

$$m=(180-ADV)/4.$$

Then, at step 2903, the value of n is set to zero to be initialized. At step 2904, it is determined whether or not $m \geq n$. When YES, i.e. when the crankshaft is positioned within a range of crank angle from 44° BTDC (starting timing for detecting cylinder pressure) to the spark ignition timing, the routine goes to step 2905. On the other hand, when NO, i.e. the crankshaft is positioned within a range of crank angle after the spark ignition timing, the routine goes to step 2907. At step 2905, in order to cause the motoring pressure to coincide with the corrected cylinder pressure $P_{ij}$ before the spark ignition timing, the cylinder pressure $P_{ij}$ is stored in the RAM 19 as a motoring pressure $PMOT_{in}$. At step 2906, the value of n is incremented by 1, and then, the routine returns to step 2904. On the other hand, at step 2907, the value of n is decreased by 1, and then, the routine goes to step 2908. At step 2908, it is determined whether or not the value n becomes 64. When YES, the routine ends, and when NO, the routine goes to step 2909. At step 2909, volumes $V_n$ and $V_{n+1}$ of combustion chamber are retrieved from a map in which the volumes $V_n$ and $V_{n+1}$ are preset in accordance with crank angle. At step 2910, a coefficient q is calculated from the volumes $V_n$ and $V_{n+1}$ and the aforementioned polytropic exponent PN in accordance with the following equation.

$$q=(V_n/V_{n+1})^{PN}.$$

Then, at step 2911, from the motoring pressure $PMOT_{in}$ stored at step 2905 or predicted in the preceding routine and the coefficient q, a motoring pressure $PMOT_{in+1}$ at a crank angle which is greater than that of the previous motoring pressure $PMOT_{in}$ by a predetermined crank angle (4°), is calculated to be predicted in accordance with the following equation.

$$PMOT_{in+1}=PMOT_{in} \times q.$$

At step 2912, the value of n is incremented by 1, and then, the routine returns to step 2908. In this way, the motoring pressures $PMOT_{ij}$ are predicted from 44° BTDC to 76° ATDC. Furthermore, the motoring pressure $PMOT_{ij}$ may be derived by storing the coefficient q in a map to retrieving the coefficient q from the map.

Figure 30:
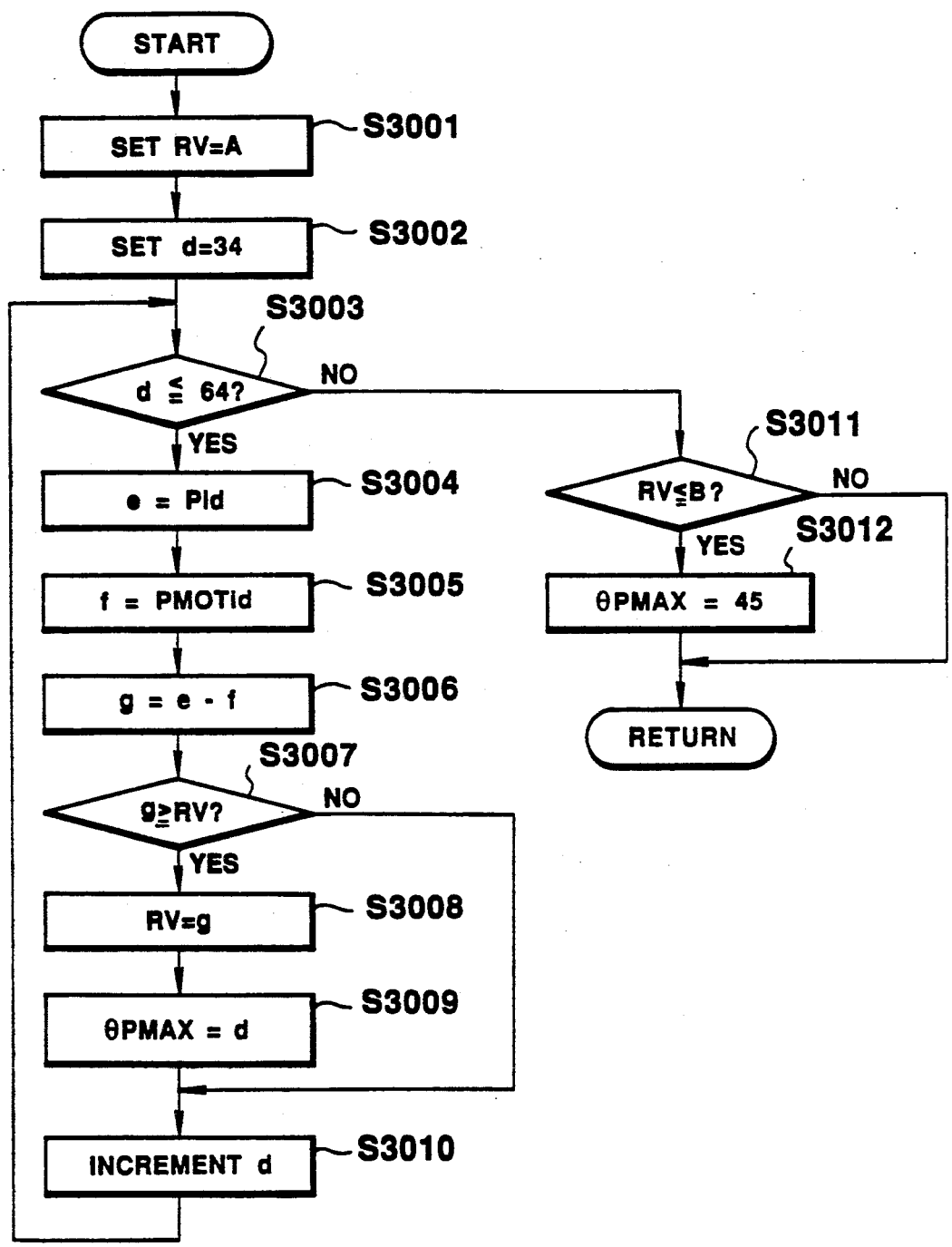
FIG. 30 is a flow chart of a program for calculating a peak position $\theta$PMAX of cylinder pressure, which is used as a sub-routine of the main operation routine of FIG. 26.

Next, a process for calculating a peak position $\theta PMAX$ of cylinder pressure in accordance with the program of FIG. 30, is described below.

Figure 34:
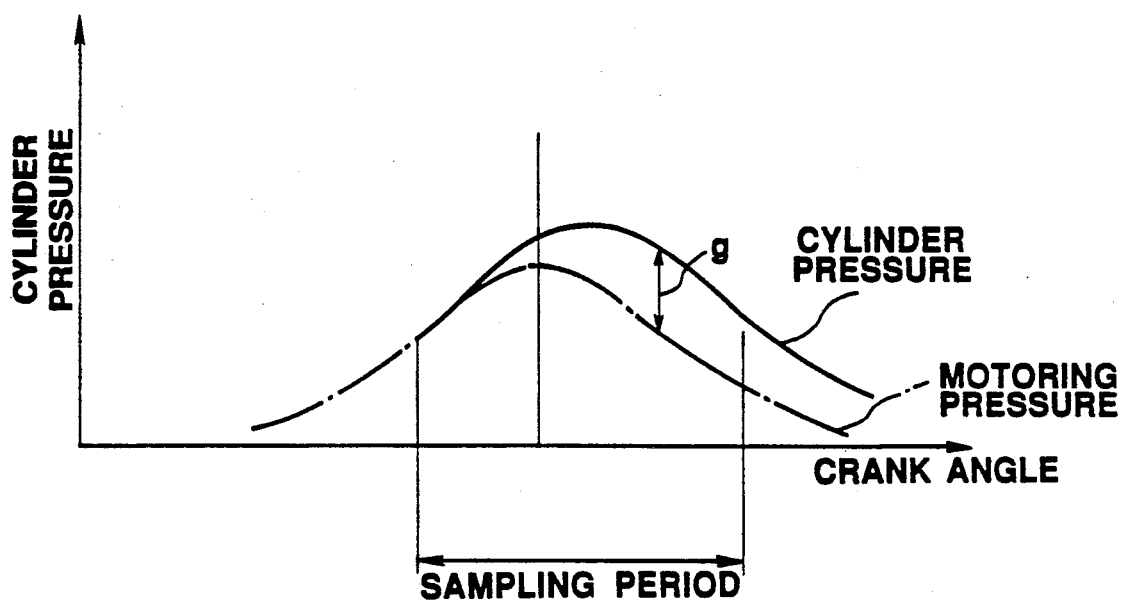
FIG. 34 is a graph showing a pressure difference between cylinder pressure and motoring pressure.

At step 3001, a reference value RV is set to a predetermined value A (about zero). At step 3002, the value of d is set to 34 to be initialized. At step 3003, it is determined whether or not the value of d is smaller than 64. When YES, the routine goes to step 3004, and when NO, the routine goes to step 3011. At step 3004, the corrected cylinder pressure $P_{id}$ is set to e. At step 3005, the motoring pressure $PMOT_{id}$ is set to f. At step 3006, a pressure difference g (=e−f) is calculated (see FIG. 34). At step 3007, it is determined whether or not the difference g is greater than or equal to the reference value RV. When YES, the routine goes to step 3008, and when NO, the routine goes to step 3010. At step 3008, the derived pressure difference g is changed to the reference value RV. At step 3009, the peak position $\theta PMAX$ is set to d (the sampling number of cylinder pressure). By this, the position at which the pressure difference g becomes maximum, is set to the peak position $\theta PMAX$. At step 3010, the value of d is incremented by 1, and then, the routine returns to step 3003. On the other hand, at step 3011, it is determined whether or not the reference value RV is less than or equal to a predetermined value B (about zero). When YES, the routine goes to step 3012, and when NO, the routine ends. At step 3012, the peak position $\theta PMAX$ is set to 45 (the sampling number of compression stroke top-dead-center), and then, routine ends.

Figure 31:
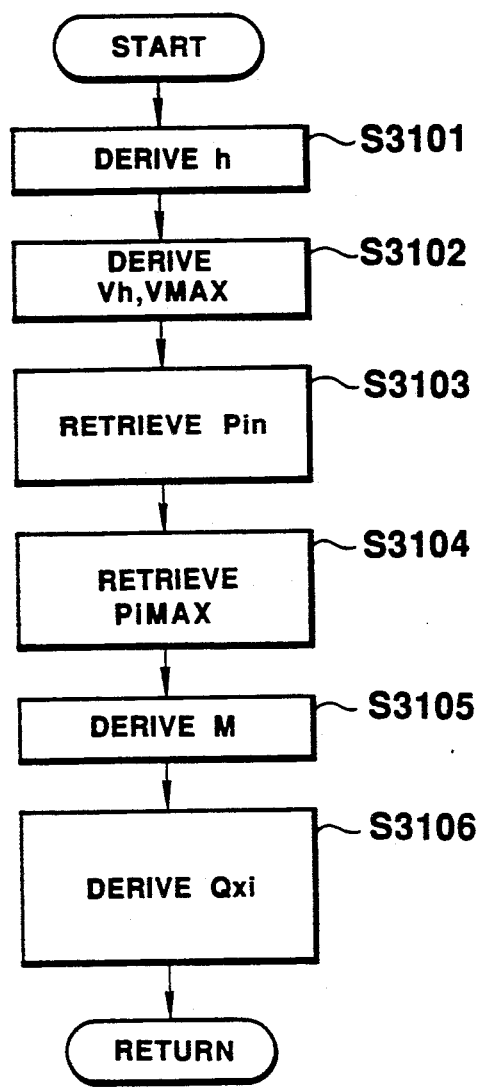
FIG. 31 is a flow chart of a program for deriving a generated heat quantity, which is used as a sub-routine of the main operation routine of FIG. 26.

Next, a process for deriving generated heat quantity in accordance with the program of FIG. 31, is described below.

At step 3101, a sampling number h of the spark ignition starting timing (=(180−ADV)/4) is calculated from the spark ignition timing ADV in the sampled engine cycle. At step 3102, a volume $V_h$ of combustion chamber at the time corresponding to the sampling number h, and a volume $V_{MAX}$ of combustion chamber at the time corresponding to the peak position $\theta PMAX$ which is set at step 3009 or 3012, are retrieved from a map. At step 3013, a cylinder pressure $P_{ih}$ corresponding to the sampling number h is retrieved from the RAM 19, and is set to 1. At step 3105, a coefficient M is calculated on the basis of the polytropic exponent PN and the volumes $V_h$ and $V_{MAX}$ of combustion chamber, in accordance with the following equation.

$$M=(V_h/V_{MAX})^{PN}$$

Then, at step 3106, a generated heat quantity $Q_{xi}$ is calculated in accordance with the following equation $$Q_{xi}=K(k-M\times e)V_{MAX}$$

in which K is a constant, and (M×e) corresponds to the cylinder pressure at the peak position $\theta PMAX$ in an adiabatic change. Therefore, $Q_{xi}$ corresponds to the generated heat quantity at the peak position $\theta PMAX$.

Figure 32:
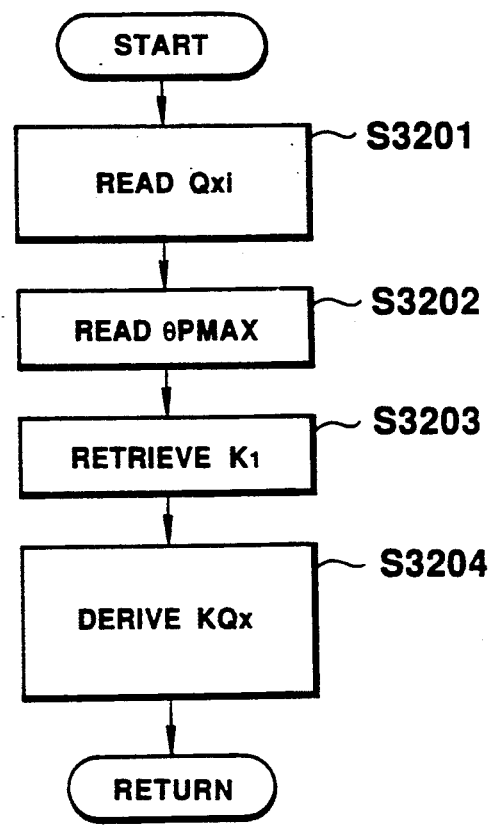
FIG. 32 is a flow chart of a program for deriving a value corresponding to workload, which is used as a sub-routine of the main operation routine of FIG. 26.
Figure 33:
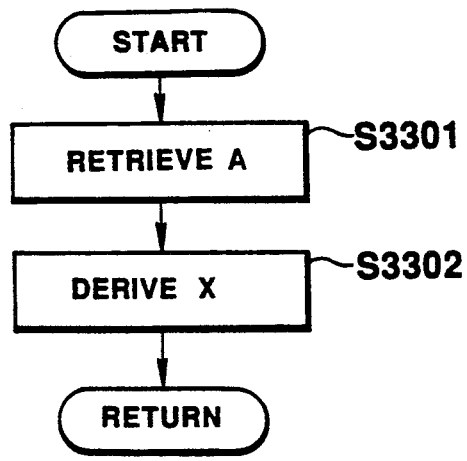
FIG. 33 is a flow chart of a program for deriving a bias quantity X, which may be substituted for the program of FIG. 27.

Next, a process for deriving a value corresponding to workload in accordance with the program of FIG. 32, is described below.

Figure 35:
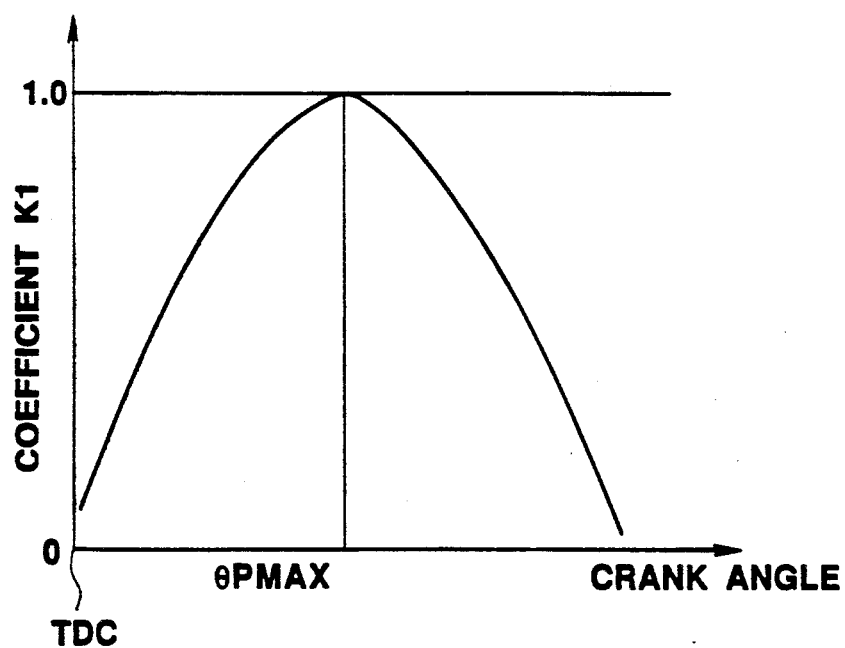
FIG. 35 is a graph showing a relationship between coefficient $K_1$ and crank angle.

At step 3201, the generated heat quantity $Q_{xi}$ derived at step 3106 is read. At step 3202, the peak position $\theta PMAX$ set at step 3009 or 3012, is read. At step 3203, a coefficient $K_1$ is retrieved from a map on the basis of the read peak position $\theta PMAX$. This coefficient $K_1$ is set on the basis of the peak position $\theta PMAX$ as shown in FIG. 35. The coefficient $K_1$ is set to 1 at the peak position $\theta PMAX$ at which the mean effective pressure Pi is maximum, and it is set so as to gradually decrease from the peak position. At step 3204, a value corresponding to workload $KQ_x$ is calculated by multiplying the retrieved coefficient $K_1$ by the aforementioned generated heat quantity $Q_{xi}$.

Figure 36:
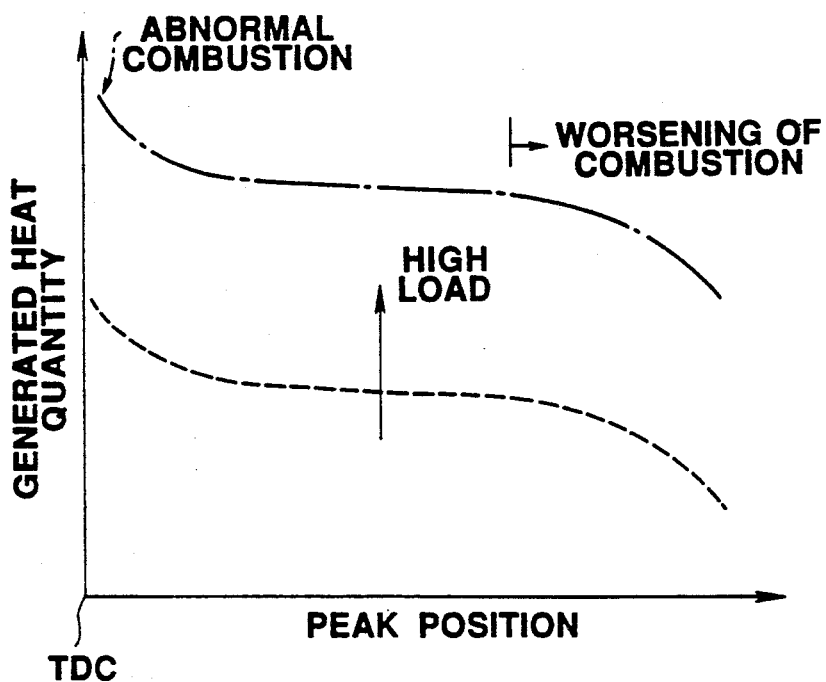
FIG. 36 is a graph showing a relationship between generated heat quantity $Q_{xi}$ and peak position $\theta$PMAX.
Figure 37:
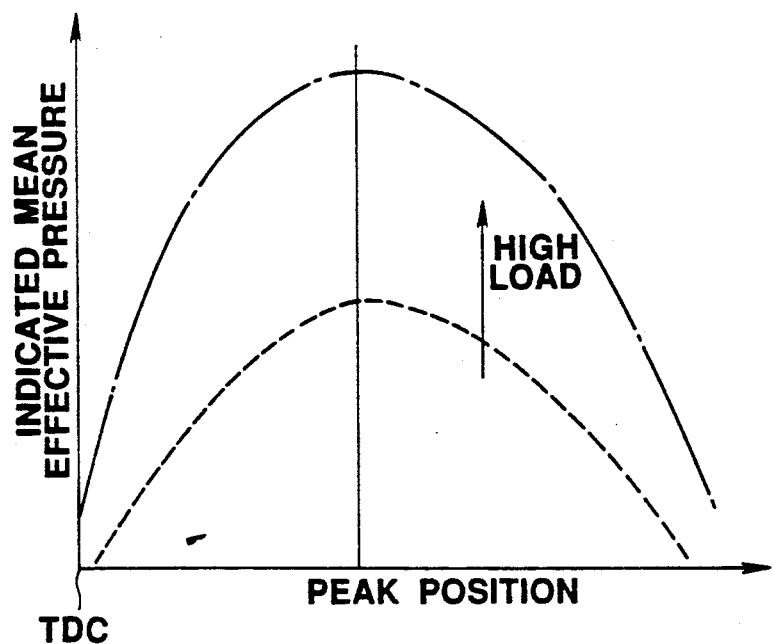
FIG. 37 is a graph showing a relationship between indicated mean effective pressure $P_i$ and peak position $\theta$PMAX.

As shown in FIG. 36, characteristics of the generated heat quantities $Q_{xi}$ relative to variation of the peak position $\theta PMAX$ are substantially similar to each other even if the engine load varies. In addition, as shown in FIG. 37, characteristics of an indicated mean effective pressure Pi relative to variation of the peak position $\theta PMAX$ are substantially similar to each other even if the engine load varies. Therefore, the coefficient $K_1$ which is set to 1 at the peak position $\theta PMAX$ at which the indicated mean effective pressure Pi is maximum, and which corresponds to variations of the indicated mean effective pressure Pi and the peak position $\theta PMAX$, is multiplied by the generated heat quantity $Q_{xi}$, so that the workload corresponding value $KQ_x$ which corresponds to the indicated mean effective pressure Pi can be derived.

Figure 38:
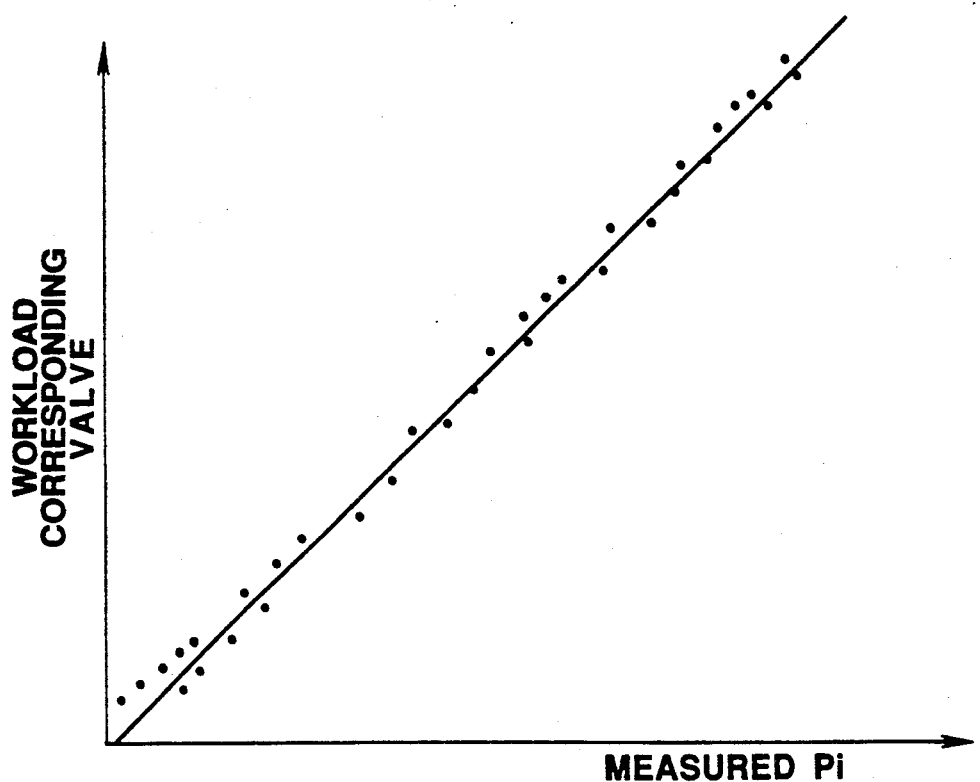
FIG. 38 is a graph showing a relationship between the workload corresponding value $KQ_x$ and the measured cylinder pressure $P_i$.

In this case, since the cylinder pressures detected by the cylinder pressure sensors 1 to 6 are corrected by the bias quantity X, it is possible to accurately detect actual cylinder pressure in the combustion chamber. As a result, as shown in FIG. 38, the workload corresponding value $KQ_x$ can be accurately detected in accordance with actual indicated mean effective pressure, so that combustion state, such as an occurrence of misfire, in an internal combustion engine can be accurately detected.

In addition, since the detected cylinder pressures of the cylinder pressure sensors 1 to 6 for respective cylinders are read at intervals of 120°, it is possible to timely detect cylinder pressures for respective cylinders (i.e. 6 cylinders) without a high-speed A/D converter and a high-speed CPU. In this embodiment, the sampling time period was set to 120° of crank angle for a system applied to a 6-cylinder engine. However, according to the present invention, the sampling period of time may be set to 720° divided by a given number of cylinders.

In addition, since the workload corresponding value $KQ_x$ which corresponds to the indicated mean effective pressure Pi is derived on the basis of the cylinder pressure detected at intervals of 120° of crank angle and the peak position, the combustion state can be accurately detected if the combustion state worsen and the combustion period consequently becomes longer (see the chain line of FIG. 1).

The second preferred embodiment of a combustion state detecting system, according to the present invention, can be applied for detecting occurrence of misfire. FIGS. 39 to 42 show various processes for detecting an occurrence of misfire according to the present invention.

Figure 39:
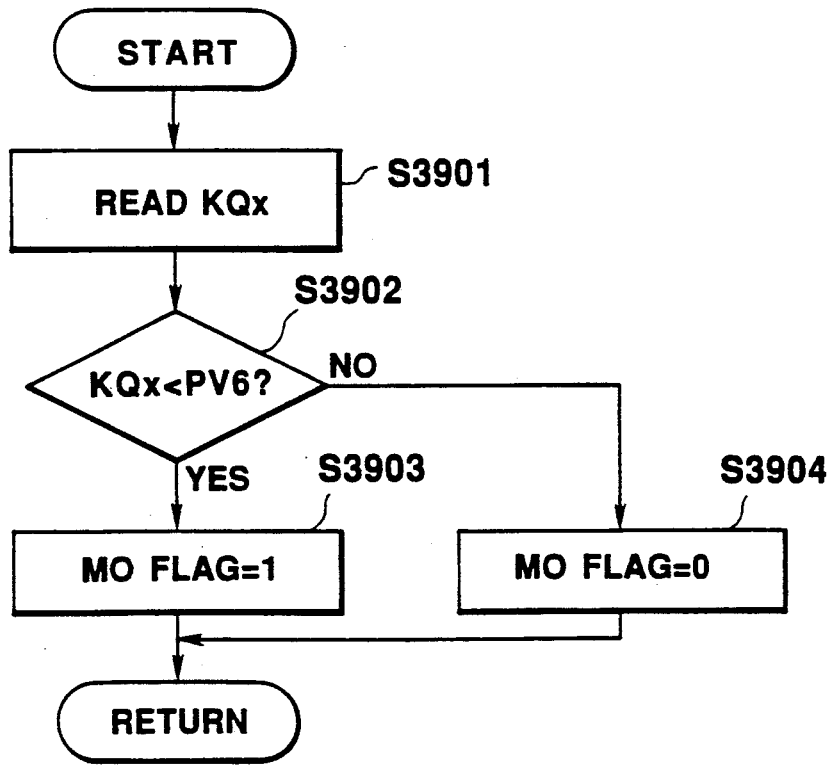
FIGS. 39 to 42 are flow charts of programs for detecting an occurrence of misfire performed by the second preferred embodiment of a combustion state detecting means, according to the present invention.

First, the misfire detecting process of FIG. 39 is described below.

At step 3901, the workload corresponding value $KQ_x$ derived at step 3204 is read. At step 3902, it is determined whether or not the read $KQ_x$ is smaller than a predetermined value PV6. When YES, the routine goes to step 3903, and when NO, the routine goes to step 3904. At step 3903, a misfire occurrence flag (MO flag) is set to 1 which indicates occurrence of misfire, to be stored in the RAM 19. On the other hand, at step 3904, the misfire occurrence flag is set to zero which indicates absence of misfire, to be stored in the RAM 19. In this way, misfire occurrence detection is performed for the respective cylinders. According to this process, it is possible to greatly improve the detection accuracy of occurrence of misfire since the workload corresponding value $KQ_x$ can be accurately detected in accordance with the actual cylinder pressure Pi.

Figure 40:
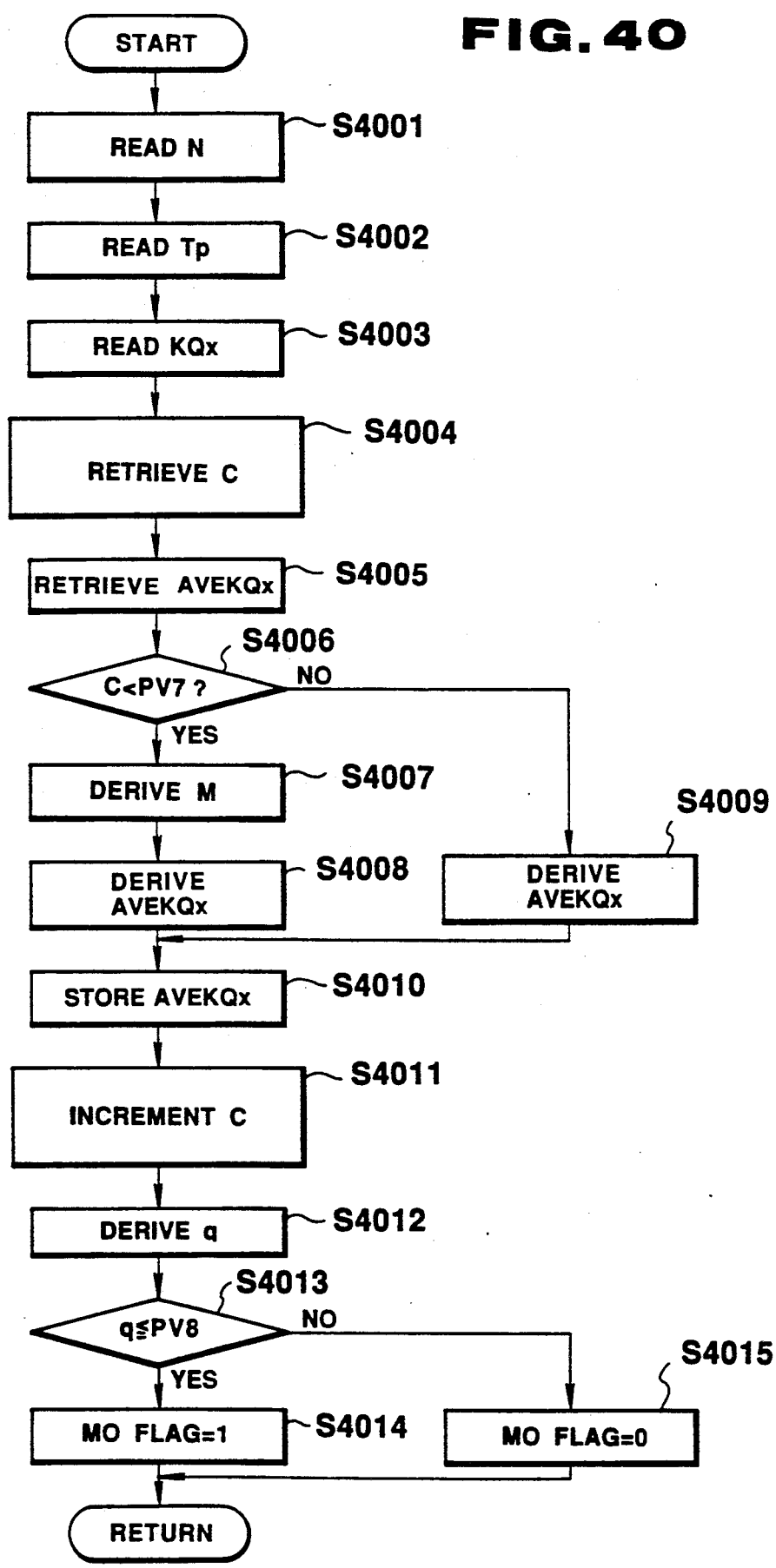

The misfire detecting process of FIG. 40 is described below.

First, the detected engine revolution speed is read at step 4001, a basic fuel injection amount Tp corresponding to the engine load (=KQ/N, K: constant, Q: intake air flow rate, N: engine revolution speed) is read at step 4002, and the workload corresponding value $KQ_x$ derived at step 3204 is read at step 4003. Then, at step 4004, a learning value C is retrieved from a map in accordance with the detected engine revolution speed, the basic fuel injection amount Tp and the number of cylinders. The learning value C is stored in the RAM 19 for the respective cylinders in accordance with the engine revolution speed and the basic fuel injection amount Tp. At step 4005, an average value $AVEKQ_x$ of KQ is retrieved from a map in accordance with the engine revolution speed, the basic fuel injection amount Tp and the cylinder number. The average values $AVEKQ_x$ are stored in the RAM 19 for the respective cylinders in accordance with the engine revolution speed and the basic fuel injection amount Tp. At step 4006, it is determined whether or not the retrieved learning value C is smaller than a predetermined value PV7. When YES, the routine goes to step 4007, and when NO, the routine goes to step 4009. At step 4007, a value M is derived by multiplying the learning value c retrieved at step 4004 by the average value $AVEKQ_x$ retrieved at step 4005. At step 4008, $AVEKQ_M$ is derived on the basis of the workload corresponding value $KQ_x$ read at step 4003, the value M and the learning value C, in accordance with the following simple mean equation.

$$AVEKQ_x = (M + KQ_x)/(C+1).$$

On the other hand, if the learning value C is equal to or greater than PV7, or NO at step 4009, the average value $AVEKQ_x$ is calculated in accordance with the following mean weighted equation $$AVEKQ_x = AVEKQ_x + (KQ_x - AVEKQ_x)/Y$$

in which Y is a predetermined value greater than 1. Then, at step 4010, the average value $AVEKQ_x$ calculated at step 4008 or 4009 is stored in a map in accordance with the engine revolution speed and the basic fuel injection amount Tp. At step 4011, the learning value C is incremented by 1, to be stored in the map. At step 4012, a ratio q ($=KQ_x/AVEKQ_x$) of the workload corresponding value $KQ_x$ read at step 4003, to the average value $AVEKQ_x$ derived at step 4008 or 4009, is calculated. At step 4013, it is determined whether or not the derived ratio q is smaller than or equal to a predetermined value PV8, e.g. zero. When YES, the routine goes to step 4014, and when NO, the routine goes to step 4015. At step 4014, the misfire occurrence flag is set to 1 which indicates an occurrence of misfire, to be stored in the RAM 19. On the other hand, at step 4015, the misfire occurrence flag is set to zero which indicates absence of misfire, to be stored in the RAM 19. In this way, determination for occurrence of misfire is performed for the respective cylinders.

Figure 41:
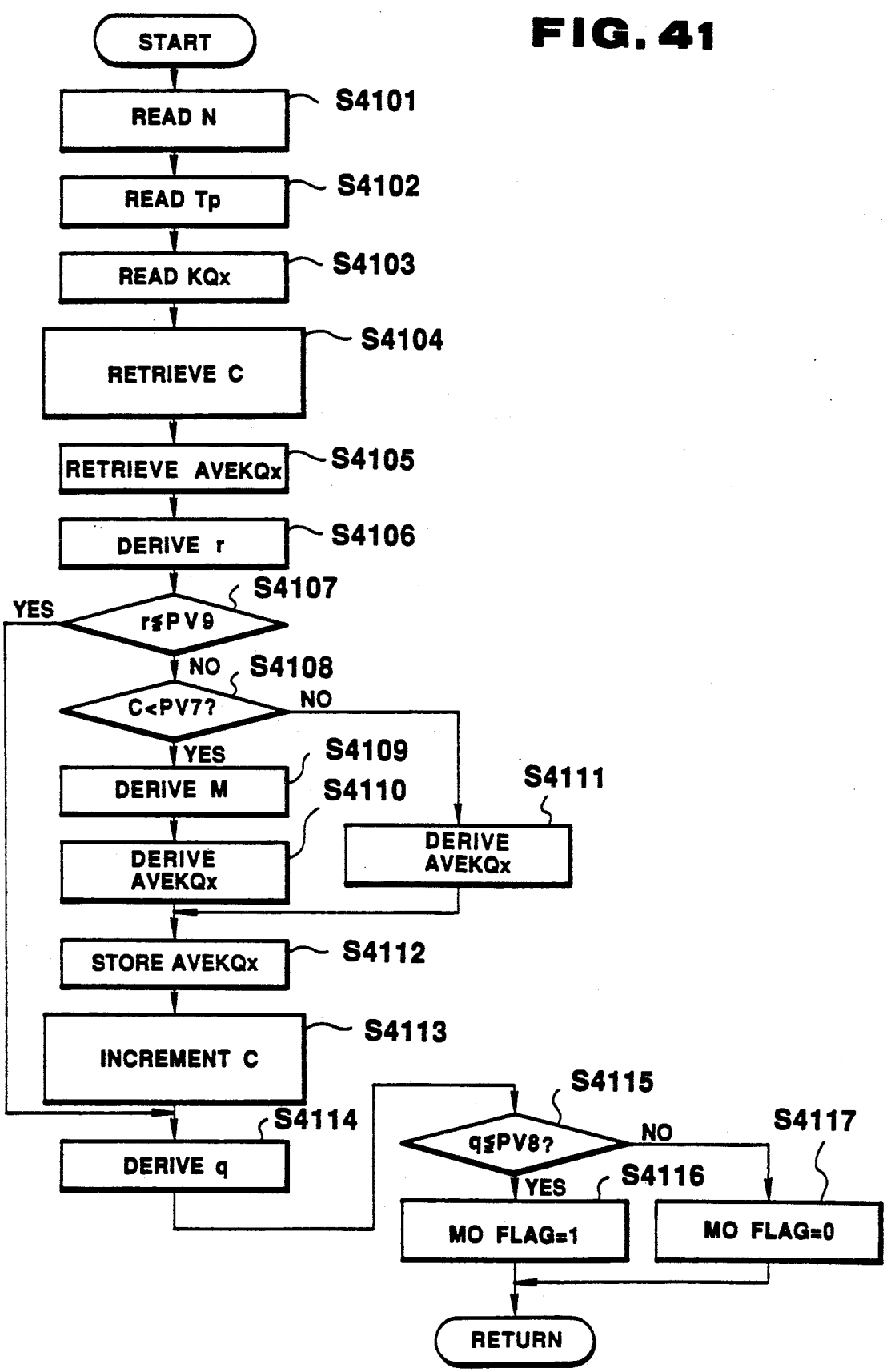

Next, the misfire detection process of FIG. 41 is described below.

This process is same as that of FIG. 40 except for step 4106 and 4107. That is, at step 4106, a ratio r ($=KQ_x/AVEKQ_x$) of the workload corresponding value $KQ_x$ read at step 4103, to the average value $AVEKQ_x$ retrieved at step 4105, is calculated. Then, at step 4107, it is determined whether or not the derived ratio r is smaller than or equal to a predetermined value PV9. When YES, i.e. when the workload corresponding value $KQ_x$ is smaller relative to the average value $AVEKQ_x$, the routine bypasses steps 4108 to 4113 to go to step 4114 which is same as step 4012 in the process of FIG. 40. On the other hand, when NO, the routine goes to step 4108 which is same as step 4006 in the process of FIG. 40. In this way, since the average value $AVEKQ_x$ is not renewed while the engine running condition having a small workload corresponding value $KQ_x$ (poor combustion state) continues, the accuracy for detecting occurrence of misfire can be improved.

Figure 42:
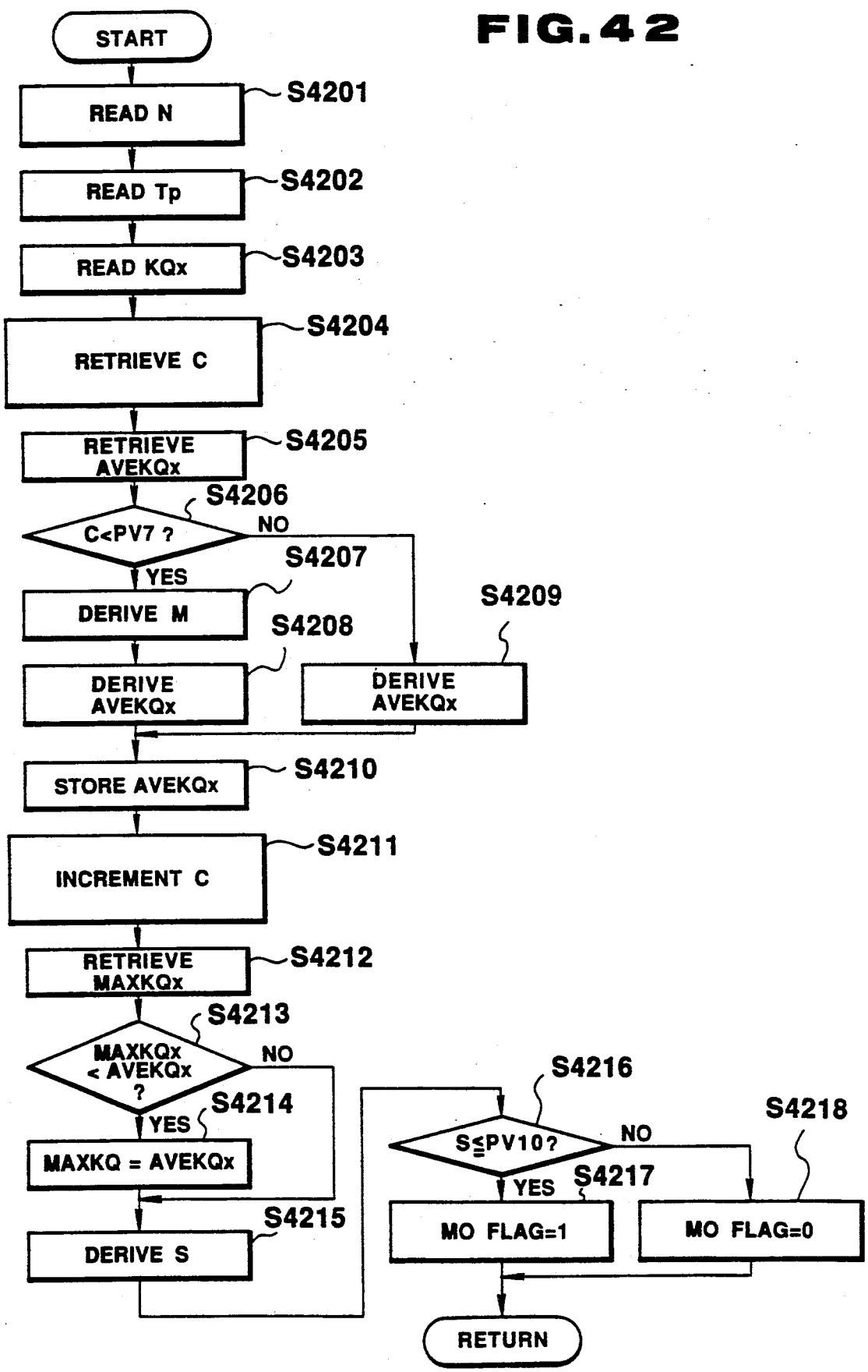

Finally, the misfire detecting process of FIG. 42 is described below.

This process is same as that of FIG. 40 except that steps 4212 to 4216 are substituted for steps 4012 and 4013. That is, at step 4212, the maximum value $MAXKQ_x$ of the average value $AVEKQ_x$ is retrieved from a map on the basis of the engine revolution speed and the basic fuel injection amount Tp. The same maximum values $MAXKQ_x$ for all cylinders are set in the map in accordance with the engine revolution speed and the basic fuel injection amount Tp. At step 4213, it is determined whether or not the average value $AVEKQ_x$ calculated at step 4208 or 4209 is greater than the retrieved maximum value $MAXKQ_x$. When YES, the routine goes to step 4214, and when NO, the routine goes to step 4215. At step 4214 (YES), the calculated $AVEKQ_x$ is stored in the map of RAM 19 as the maximum value $MAXKQ_x$. At step 4215 (NO), a ratio S is calculated on the basis of the average value $AVEKQ_x$ derived at step 4208 or 4209, the workload corresponding value $KQ_x$ read at step 4203 and the maximum value $MAXKQ_x$, in accordance with the following equation.

$$S = MAXKQ_x \times KQ_x / AVEKQ_x.$$

Then, at step 4216, it is determined whether or not the calculated ratio S is less than or equal to a predetermined value PV10. When YES, it is determined that misfire occurs and the routine goes to step 4217, and when NO, the routine goes to step 4218. In this way, since the same $MAXKQ_x$ is set for all of cylinders, to derive the ratio S from this $MAXKQ_x$ for the respective cylinders, it is possible to accurately detect an occurrence of misfire for respective cylinders even if there is dispersion in the output values of the cylinder pressure sensors 1 to 6.

Referring to FIGS. 43 to 48, there is shown a misfire detecting process performed by the third preferred embodiment of a combustion state detecting system, according to the present invention.

In this embodiment, the CPU 17 serves as a sampling means, a combustion chamber volume setting means, a bias quantity setting means, a cylinder pressure correcting means, a cylinder pressure predicting means, a mean effective pressure calculating means, a motoring pressure predicting means, a motoring mean effective pressure calculating means and a misfire occurrence determinating means.

Figure 43:
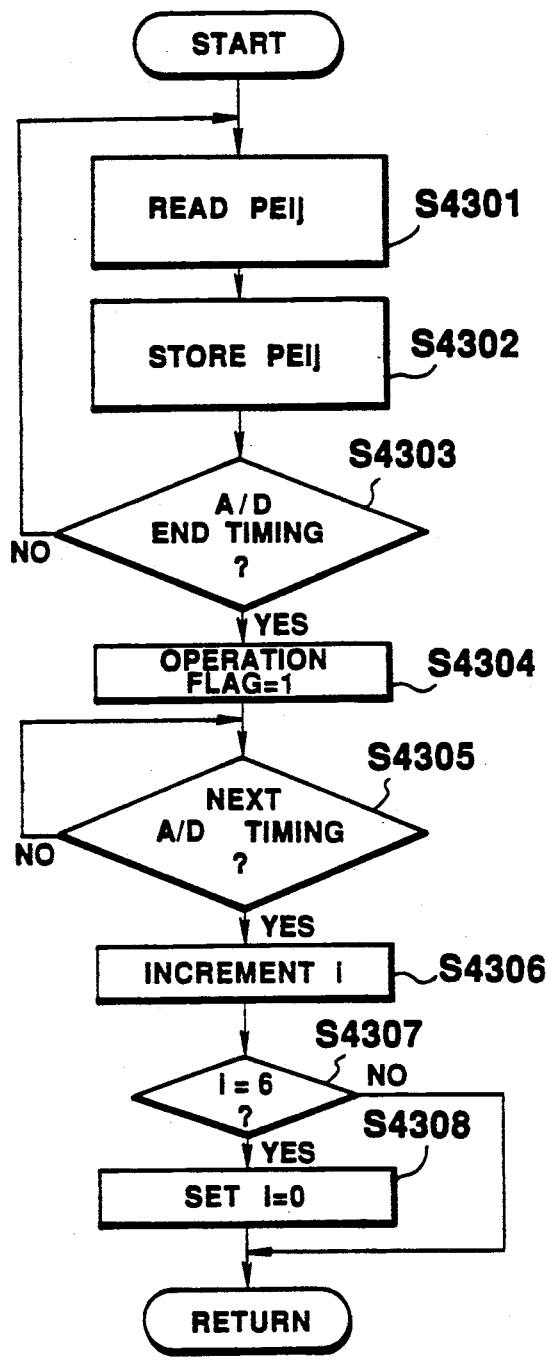
FIG. 43 is a flow chart of a program for sampling cylinder pressure data, which is used in a combustion state detecting process performed by the third preferred embodiment of a combustion state detecting system, according to the present invention.

FIG. 43 shows a flow chart of a program for sampling cylinder pressure data. This program is the same as that of FIG. 6. Therefore, in this embodiment, the sub-routines of FIGS. 8 to 18 may be used.

Figure 44:
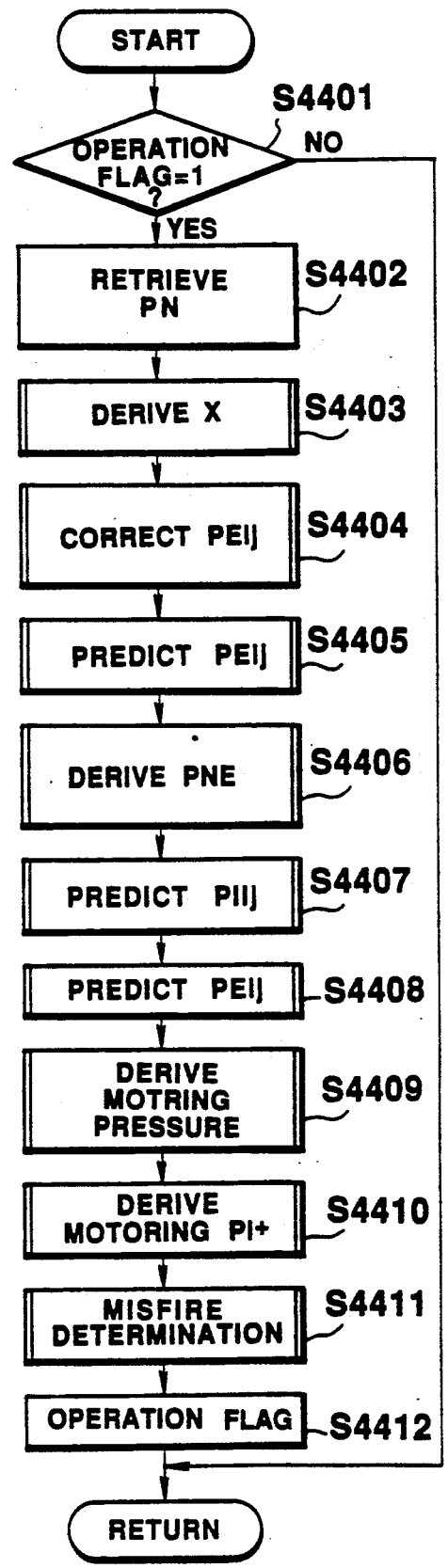
FIG. 44 is a flow chart of a main operation routine, which is used in combustion state detecting process performed by the third preferred embodiment of a combustion state detecting system, according to the present invention.

FIG. 44 shows a flow chart of a main routine executed by the control unit 15. This routine is same as that of FIG. 7 except for steps 4409 to 4411. That is, steps 4401 to 4408 and 4412 are same as steps 701 to 709 of the program of FIG. 7. In the program of FIG. 44, at step 4409, a motoring pressure at a non-combustion state (no-spark timing) is calculated in accordance with the flow chart of FIG. 45 which will be described hereinafter. At step 4410, an indicated mean effective motoring pressure is calculated in accordance with the flow chart of FIG. 46 which will be described hereinafter. At step 4411, determination for occurrence of misfire is performed in accordance with the flow chart of FIG. 47.

Figure 45:
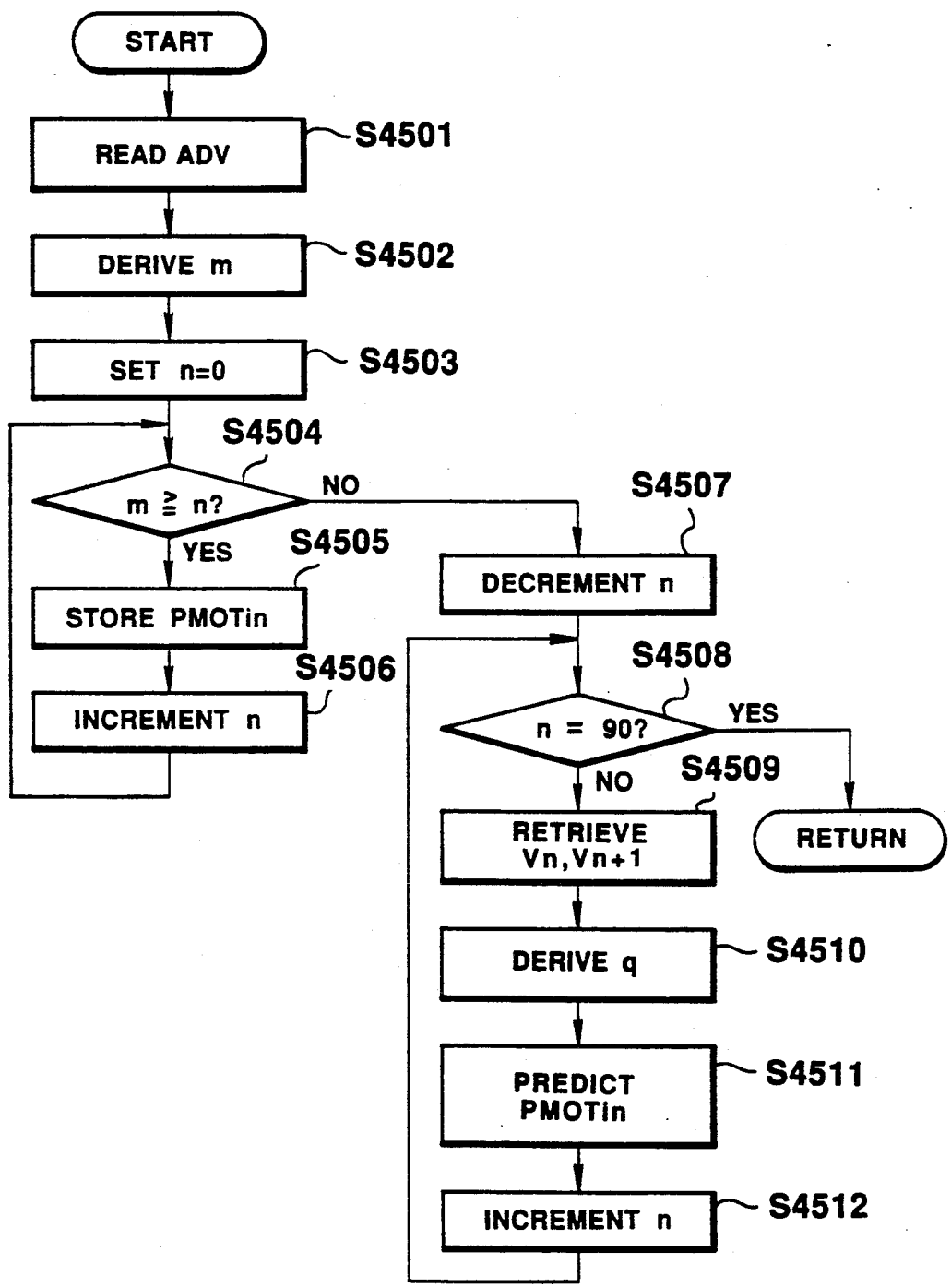
FIG. 45 is a flow chart of a program for deriving a motoring pressure, which is used as a sub-routine of the main operation routine of FIG. 44.

Next, a process for calculating the motoring pressure in accordance with the program of FIG. 45 is described.

First, at step 4501, a spark ignition timing ADV (BTDC) in an engine cycle in which the cylinder pressure is sampled, is read. At step 4502, a predicted number of times m is calculated on the basis of the read spark ignition timing ADV in accordance with the following equation.

$$m = (180 - ADV)/4.$$

Then, at step 4503, the value of n is set to zero to be initialized. At step 4504, it is determined whether or not $m \geq n$. When YES, i.e. when the crankshaft is positioned within a range of crank angle from 180° BTDC position (compression bottom-dead-center) to the spark ignition timing, the routine goes to step 4505. On the other hand, when NO, i.e. when the crankshaft is positioned within a range of crank angle after the spark ignition timing, the routine goes to step 4507. At step 4505, in order to cause the motoring pressure to coincide with the corrected cylinder pressure $P_{ij}$ before the spark ignition timing, the cylinder pressure $P_{ij}$ is stored in the RAM 19 as a motoring pressure $PMOT_{in}$. At step 4506, the value of n is incremented by 1, and then, the routine returns to step 4504. On the other hand, at step 4507, the value of n is decreased by 1, and then, the routine goes to step 4508. At step 4508, it is determined whether or not the value n becomes 90. When YES, the routine ends, and when NO, the routine goes to step 4509. At step 4509, combustion chamber volumes $V_n$ and $V_{n+1}$ are retrieved from a map in which the volumes $V_n$ and $V_{n+1}$ are preset in accordance with crank angle. At step 4510, a coefficient q is calculated from the volumes $V_n$ and $V_{n+1}$ and the aforementioned polytropic exponent PN in accordance with the following equation.

$$q = (V_n/V_{n+1})^{PN}$$

Then, at step 4511, from the motoring pressure $PMOT_{in}$ stored at step 4505 or predicted in the preceding routine and the coefficient q, a motoring pressure $PMOT_{in+1}$ at a crank angle which is greater than that of the previous motoring pressure $PMOT_{in}$ by a predetermined crank angle (4°), is calculated to be predicted in accordance with the following equation.

$$PMOT_{in+1} = PMOT_{in} \times q$$

At step 4512, the value of n is incremented by 1, and then, the routine returns to step 4508. In this way, the motoring pressures $PMOT_{ij}$ are predicted from 180° BTDC to 180° ATDC. Furthermore, the motoring pressure $PMOT_{ij}$ may be derived by storing the coefficient q in a map to retrieving the coefficient q from the map. In addition, the motoring pressure may be always derived since the motoring pressure varies in accordance with variation of engine running condition, such as engine load and engine revolution speed.

Figure 46:
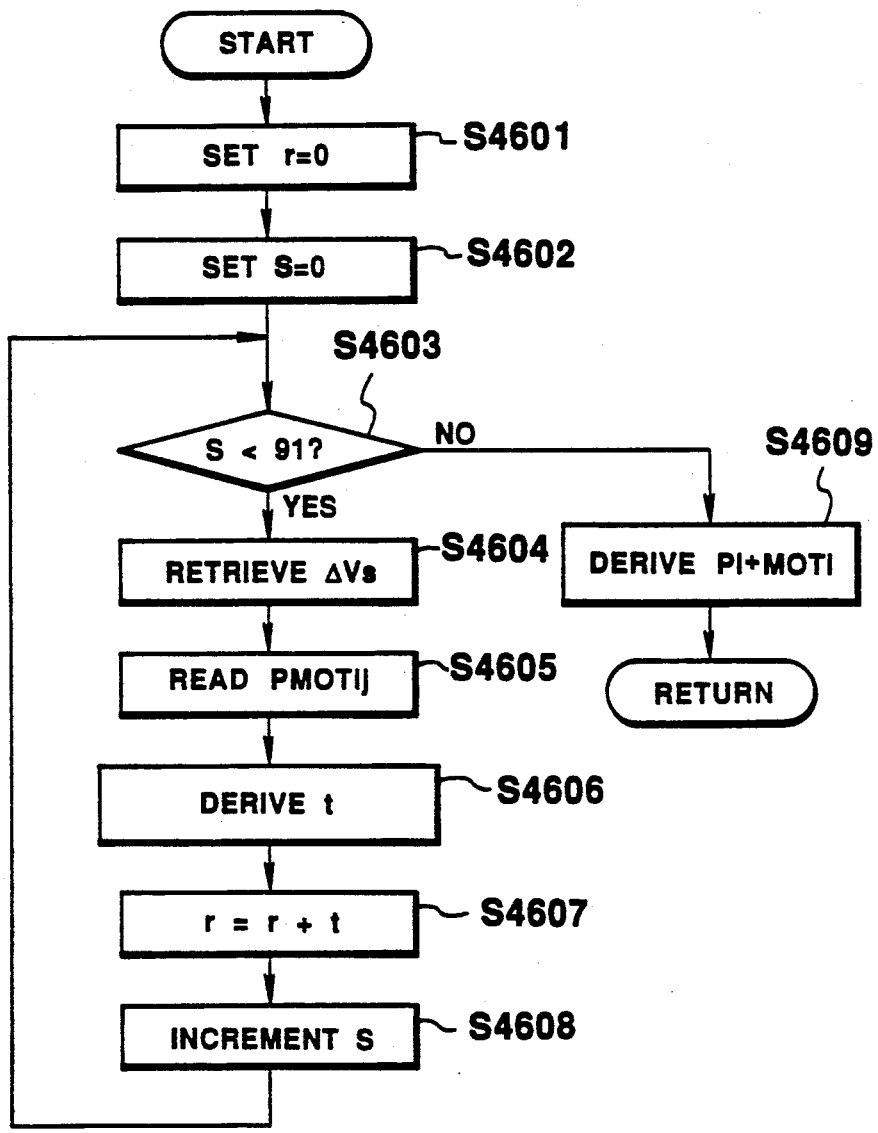
FIG. 46 is a flow chart of a program for deriving a motoring indicated mean effective pressure, which is used as a sub-routine of the main operation routine of FIG. 44.

Next, a process for calculating a motoring indicated mean effective pressure (an indicated mean effective pressure at motoring) in accordance with the program of FIG. 46, is described below.

First, at steps 4601 and 4602, the values of r and S are set to zero to be initialized. At step 4603, it is determined whether or not the value S is smaller than 91. When YES, the routine goes to step 4604, and when NO, the routine goes to step 4609. At step 4604 (YES), a variation $\Delta V_s$ of combustion chamber volume while the cylinder pressure is sampled, is retrieved from a map in accordance with the value S. At step 4605, the motoring pressure $PMOT_i$ which is set in the routine of FIG. 45, is read from the RAM 19 in accordance with the value S. At step 4606, a partial workload $t (= PMOT_{is} \times \Delta V_s)$ is derived by multiplying the retrieved variation $\Delta V_s$ of volume of combustion chamber and the read motoring pressure $PMOT_{is}$. At step 4607, new total workload r is derived by adding the derived partial workload t to the total workload r which is set in the preceding routine. At step 4608, the value S is incremented by 1, and then, the routine returns to step 4603. In this way, the total workload r in a range from S=0 to S=90, i.e. for an interval of 360° of crank angle (for an interval of crank angle in the compression and expansion strokes), may be derived. On the other hand, if NO at step 4603, the routine goes to step 4609. At step 4609, a motoring indicative mean effective pressure $P_i + MOT_i$ is calculated to be predicted in accordance with the following equation.

$$P_i + MOT_i = r/V_s$$

in which $V_s$ is a total volume of combustion chamber in a range of crank angle between 0° to 360°.

Figure 47:
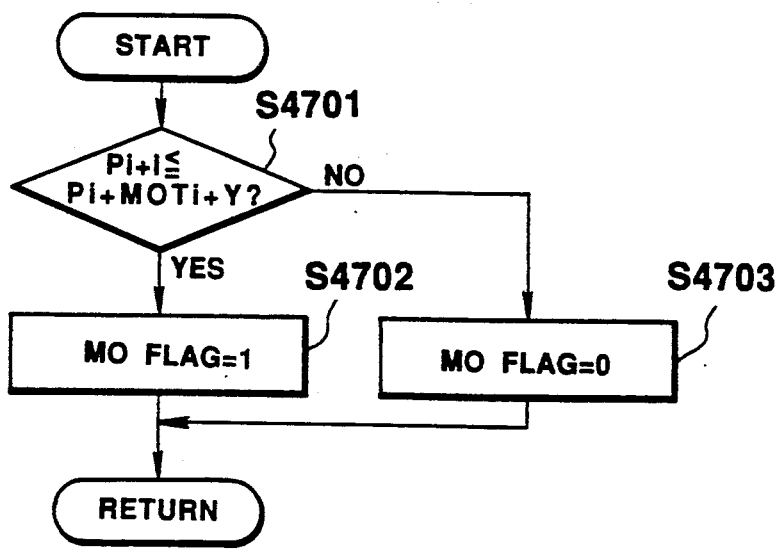
FIG. 47 is a flow chart of a program for determining an occurrence of misfire, which is used as a sub-routine of the main operation routine of FIG. 44.
Figure 48:
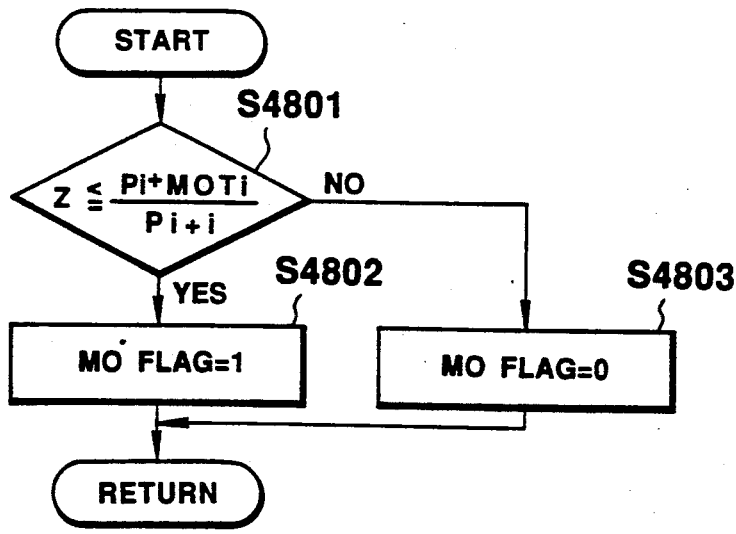
FIG. 48 is a flow chart of a program for determining an occurrence of misfire, which may be substituted for the program of FIG. 47.

Next, a process for determining an occurrence of misfire in accordance with the program of FIG. 47, is described below.

At step 4701, the total of the motoring indicated mean effective pressure $P_i + MOT_i$ derived at step 4609 and a predetermined value Y is compared with the component $P_i + i$ derived at the same step as step 1309 of the program of FIG. 13 of the first preferred embodiment. When $P_i + i \leq P_i + MOT_i + Y$, the routine goes to step 4702, and when $P_i + i > P_i + MOT_i + Y$, the routine goes to step 4703. At step 4702, the misfire occurrence flag is set to 1 so that an occurrence of misfire is stored in the RAM 19. At step 4703, the misfire occurrence flag is set to zero so that absence of misfire is stored in the RAM 19. In this way, determination for occurrence of misfire is performed for the respective cylinders. Furthermore, the program of FIG. 48 in which it is determined whether or not $Z \leq P_i + MOT_i + /P_i + i$ at step 4801, may be substituted for the program of FIG. 47. In this way, it is possible to accurately detect an occurrence of misfire if there is a dispersion in sensitivity of the cylinder pressures for the respective cylinders.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A system for detecting combustion state in an internal combustion engine, said system comprising:

cylinder pressure detecting means for monitoring cylinder pressure in a combustion chamber to produce a cylinder pressure indicative signal;

crank angle detecting means for monitoring an angular position of a crankshaft to produce a crank angle indicative signal;

sampling means for sampling said cylinder pressure indicative signal at every predetermined crank angle for a predetermined sampling period which corresponds to a predetermined range of crank angle determined on the basis of said crank angle indicative signal;

volume deriving means for deriving a volume of the combustion chamber for every predetermined crank angle;

bias quantity deriving means for deriving a bias quantity used for biasing said cylinder pressure indicative signal, on the basis of the derived volume of the combustion chamber for said sampling period, and on the basis of the sampled cylinder pressure indicative signals;

cylinder pressure correcting means for correcting the sampled cylinder pressure indicative signals on the basis of the derived bias quantity;

cylinder pressure predicting means for predicting cylinder pressures for an non-sampling period in which the crankshaft is positioned out of said predetermined range of crank angle; and mean effective pressure deriving means for deriving an indicated mean effective pressure on the basis of the corrected cylinder pressure and said predicted cylinder pressure.

2. A system as set forth in claim 1, wherein said sampling means samples said cylinder pressure indicative signal in a range from 120° to 240° of the crank angle, and said cylinder pressure predicting means predicts cylinder pressure in a range from 0° to 120° and from 240° to 360° of crank angle, so as to derive the indicated mean effective pressure in compression and expansion strokes.

3. A system as set forth in claim 1, wherein said internal combustion engine has a plurality of cylinders, and said system detects a combustion state of the respective cylinders.

4. A system as set forth in claim 3, wherein said predetermined range of crank angle is 720° divided by the number of cylinders.

5. A system as set forth in claim 1, which further comprises misfire occurrence determining means for determining occurrence of misfire on the basis of said indicated mean effective pressure.

6. A system as set forth in claim 1, which further comprises:

motoring pressure predicting means for predicting a motoring pressure of the combustion chamber in a non-combustion state on the basis of the corrected cylinder pressure before a spark ignition timing and on the basis of the derived volume of the combustion chamber;

motoring effective pressure deriving means for deriving a motoring indicated mean effective pressure of the combustion chamber in non-combustion state on the basis of the predicted motoring pressure; and misfire occurrence deciding means for deciding an occurrence of misfire on the basis of said motoring indicated mean effective pressure and on the basis of said indicated mean effective pressure.

7. A system as set forth in claim 6, wherein said sampling means samples said cylinder pressure indicative signal in a range from 136° to 256° of crank angle, and said cylinder pressure predicting means predicts cylinder pressure in a range from 0° to 136° and from 256° to 360° of crank angle, so as to derive the indicated mean effective pressure in compression and expansion strokes.

8. A system as set forth in claim 6, wherein said internal combustion engine has a plurality of cylinders, and said system detects a combustion state of the respective cylinders.

9. A system as set forth in claim 8, wherein said predetermined range of crank angle is 720° divided by the number of cylinders.

10. A system for detecting combustion state in an internal combustion engine, said system comprising:

cylinder pressure detecting means for monitoring a cylinder pressure in a combustion chamber of the engine to produce a cylinder pressure indicative signal;

crank angle detecting means for monitoring an angular position of a crankshaft to produce a crank angle indicative signal;

sampling means for sampling said cylinder pressure indicative signal at every predetermined crank angle for a sampling period in which the crankshaft is positioned within a predetermined range of crank angle, on the basis of said crank angle indicative signal;

volume deriving means for deriving volume of the combustion chamber at every predetermined crank angle;

bias quantity deriving means for deriving bias quantity used for biasing said cylinder pressure indicative signal, on the basis of the derived volume of the combustion chamber for said sampling period, and on the basis of the sampled cylinder pressure indicative signals;

cylinder pressure correcting means for correcting the sampled cylinder pressure indicative signals on the basis of the derived bias quantity;

peak position determining means for determining a peak position of cylinder pressure on the basis of the corrected cylinder pressure;

heat generation quantity deriving means for deriving a heat generation quantity of the engine on the basis of the decided peak position, the corrected cylinder pressure and the derived volume of the combustion chamber; and workload deriving means for deriving a workload value of the engine on the basis of the derived heat generation quantity and the determined peak position.

11. A system as set forth in claim 10, wherein said internal combustion engine has a plurality of cylinders, and said system detects a combustion state of the respective cylinders.

12. A system as set forth in claim 11, wherein said predetermined range of crank angle is 720° divided by the number of cylinders.

13. A system as set forth in claim 10, which further comprises misfire occurrence determining means for determining an occurrence of misfire on the basis of said indicated mean effective pressure.

14. A system for detecting combustion state in an internal combustion engine, said system comprising:

crank angle detecting means for monitoring an angular position of a crankshaft to produce a crank angle indicative signal;

cylinder pressure detecting means for detecting cylinder pressures in a combustion chamber for a predetermined detecting range of crank angle;

cylinder pressure predicting means for predicting cylinder pressures for a range other than the predetermined detecting range of crank angle in compression and expansion strokes of the engine; and mean effective pressure deriving means for deriving an indicated mean effective pressure on the basis of the detected cylinder pressures and the predicted cylinder pressures.

* * * * *